US006512791B1

(12) United States Patent
Takayama

(10) Patent No.: US 6,512,791 B1
(45) Date of Patent: *Jan. 28, 2003

(54) IMAGE PROCESSING APPARATUS HAVING MEANS FOR CONTROLLING EXPOSURE USING AN ORTHOGONAL TRANSFORMATION COEFFICIENT

(75) Inventor: Makoto Takayama, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/881,866

(22) Filed: May 12, 1992

(30) Foreign Application Priority Data

| May 15, 1991 | (JP) | ............................................. 3-109999 |
| May 15, 1991 | (JP) | ............................................. 3-110213 |
| May 15, 1991 | (JP) | ............................................. 3-110214 |
| May 15, 1991 | (JP) | ............................................. 3-110215 |
| May 15, 1991 | (JP) | ............................................. 3-110216 |
| Jun. 20, 1991 | (JP) | ............................................. 3-148437 |

(51) Int. Cl.$^7$ ................................................ H04N 7/12
(52) U.S. Cl. .................. 375/240.01; 348/364; 382/248
(58) Field of Search ................................ 358/174, 228, 358/426, 906, 909, 227, 136; 354/400–409; 382/56, 232, 248, 250; 348/255, 257, 345, 347, 349, 354, 355, 363–365, 403, 220.1, 221.1, 229.1, 362; 375/240.01, 240.18, 240.2, 240.24; H04N 7/133, 7/12

(56) References Cited

U.S. PATENT DOCUMENTS

| 4,758,889 A | * | 7/1988 | Keesen et al. ............... 348/403 |
| 5,016,107 A | * | 5/1991 | Sasson et al. ............... 358/906 |
| 5,032,927 A | * | 7/1991 | Watanabe et al. ............ 358/909 |
| 5,045,925 A | * | 9/1991 | Saito ........................... 358/133 |
| 5,065,246 A | * | 11/1991 | Takemoto et al. ........... 358/228 |
| 5,073,821 A | * | 12/1991 | Juri .............................. 358/133 |
| 5,105,278 A | * | 4/1992 | Takemoto .................... 358/228 |
| 5,109,451 A | * | 4/1992 | Aono et al. ................... 382/56 |
| 5,142,380 A | | 8/1992 | Sakagami et al. ........... 358/432 |
| 5,144,428 A | * | 9/1992 | Okuda et al. ................ 358/136 |
| 5,144,450 A | * | 9/1992 | Kikuchi et al. .............. 358/227 |
| 5,155,592 A | * | 10/1992 | Verbiest et al. .............. 358/135 |
| 5,295,077 A | * | 3/1994 | Fukuoka ...................... 358/426 |
| 5,341,170 A | * | 8/1994 | Takemoto .................... 348/349 |

FOREIGN PATENT DOCUMENTS

| DE | 4033552 | 4/1991 | .......... H04N/1/415 |
| EP | 346636 A3 | 12/1989 | |
| EP | 0455434 | 11/1991 | ............ H04N/5/21 |
| EP | 0481768 | 4/1992 | ............ H03M/7/30 |
| FR | 2575886 | 4/1985 | .......... H04N/5/217 |
| FR | 2575886 | 7/1986 | .......... H04N/5/217 |
| JP | 62-230236 | 10/1987 | .......... H04B/14/00 |
| JP | 63-150475 | 6/1988 | ............ F04B/1/20 |
| JP | 2-154572 | 6/1990 | .......... H04N/1/415 |
| JP | 2-159185 | 6/1990 | ............ H04N/7/13 |

OTHER PUBLICATIONS

IEEE Transactions on Acoustics, Speech and Signal Processing, vol. 37, No. 11, Nov. 1989, New York, pp. 1743–1749, "Adaptive Cosine Transform Coding of Images in Perceptual Domain."

* cited by examiner

*Primary Examiner*—Richard Lee
(74) *Attorney, Agent, or Firm*—Fitzpatrick, Cella, Harper & Scinto

(57) ABSTRACT

An image processing apparatus, which performs an orthogonal transformation on an image signal and which compresses the image signal, includes a control unit for controlling a range of the image signal based on a coefficient of a DC component of an output of the orthogonal transformation before the orthogonal transformation.

10 Claims, 22 Drawing Sheets

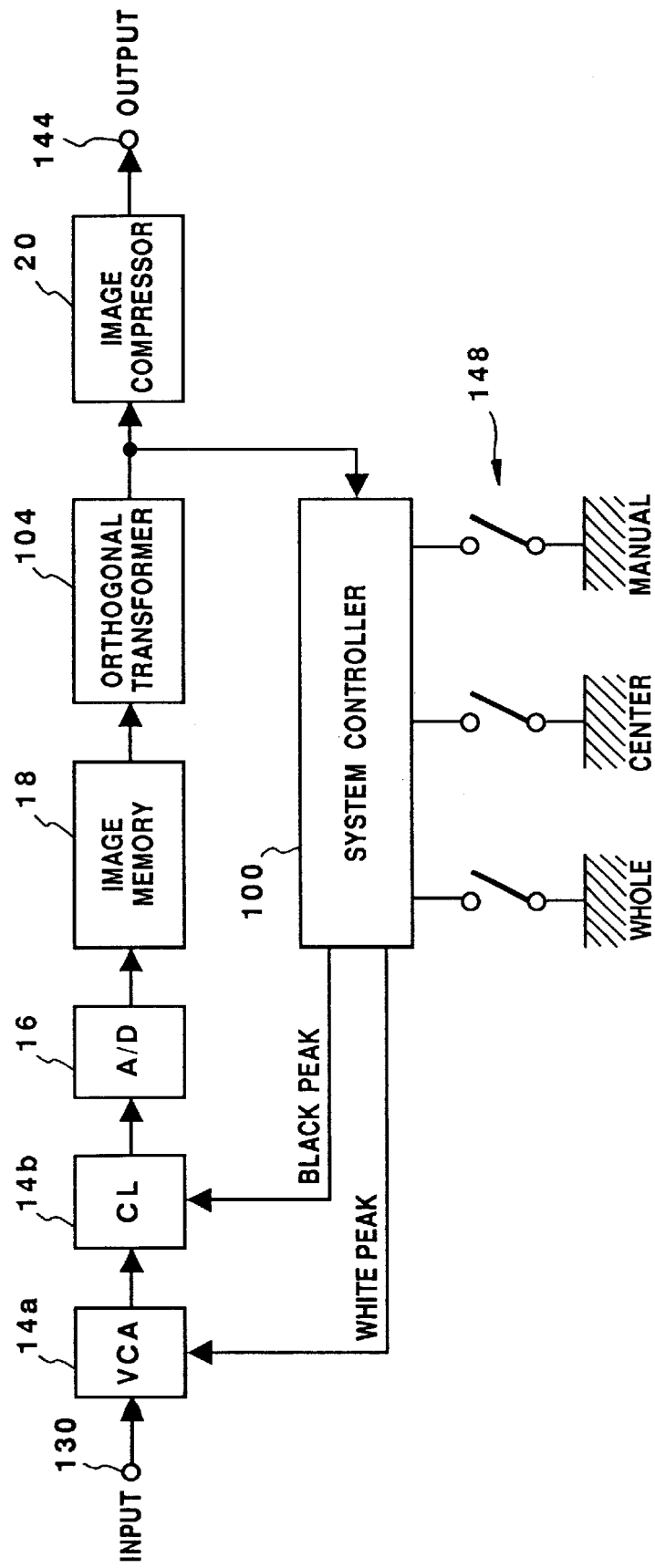
F I G. 4

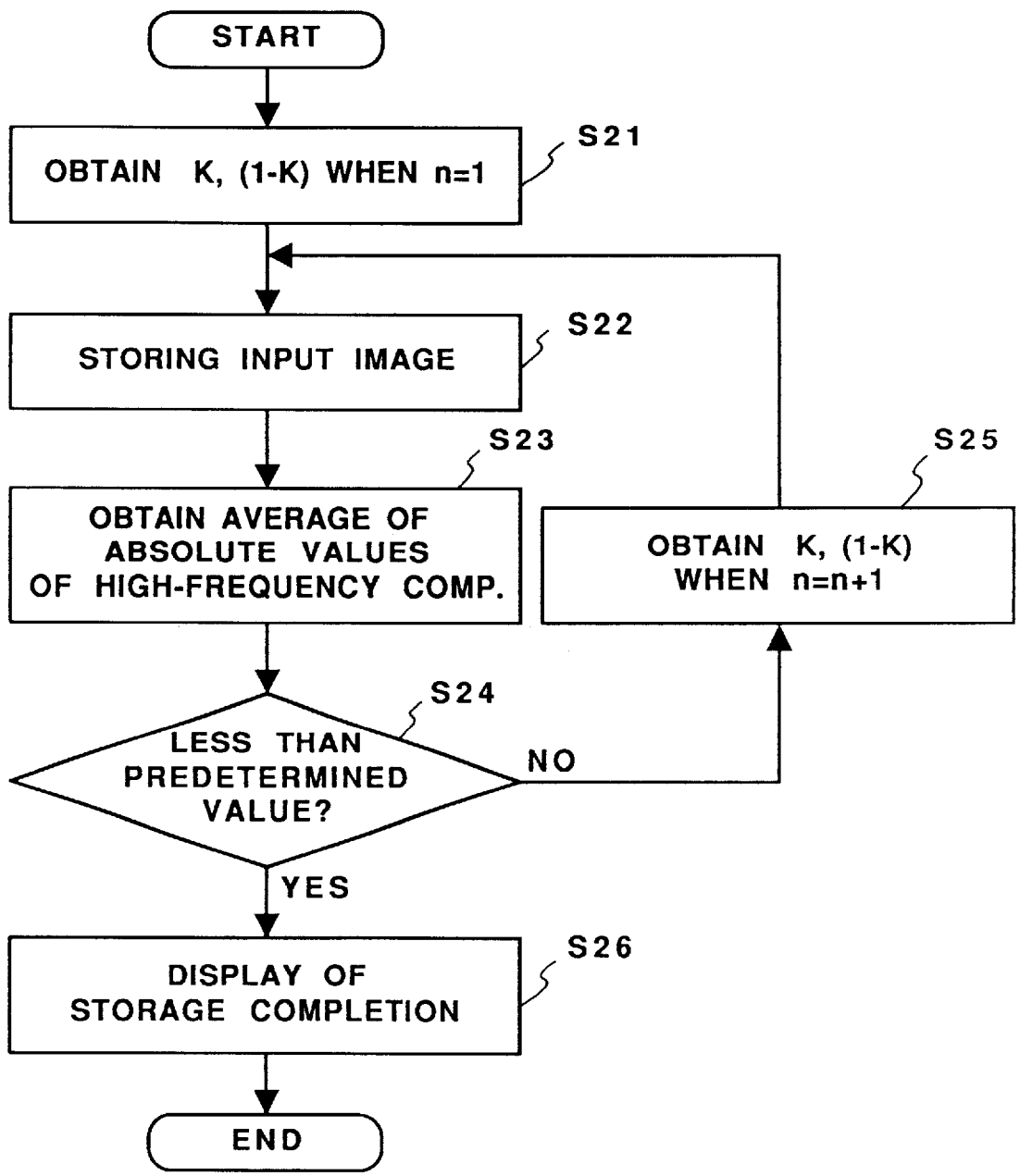
F I G. 8

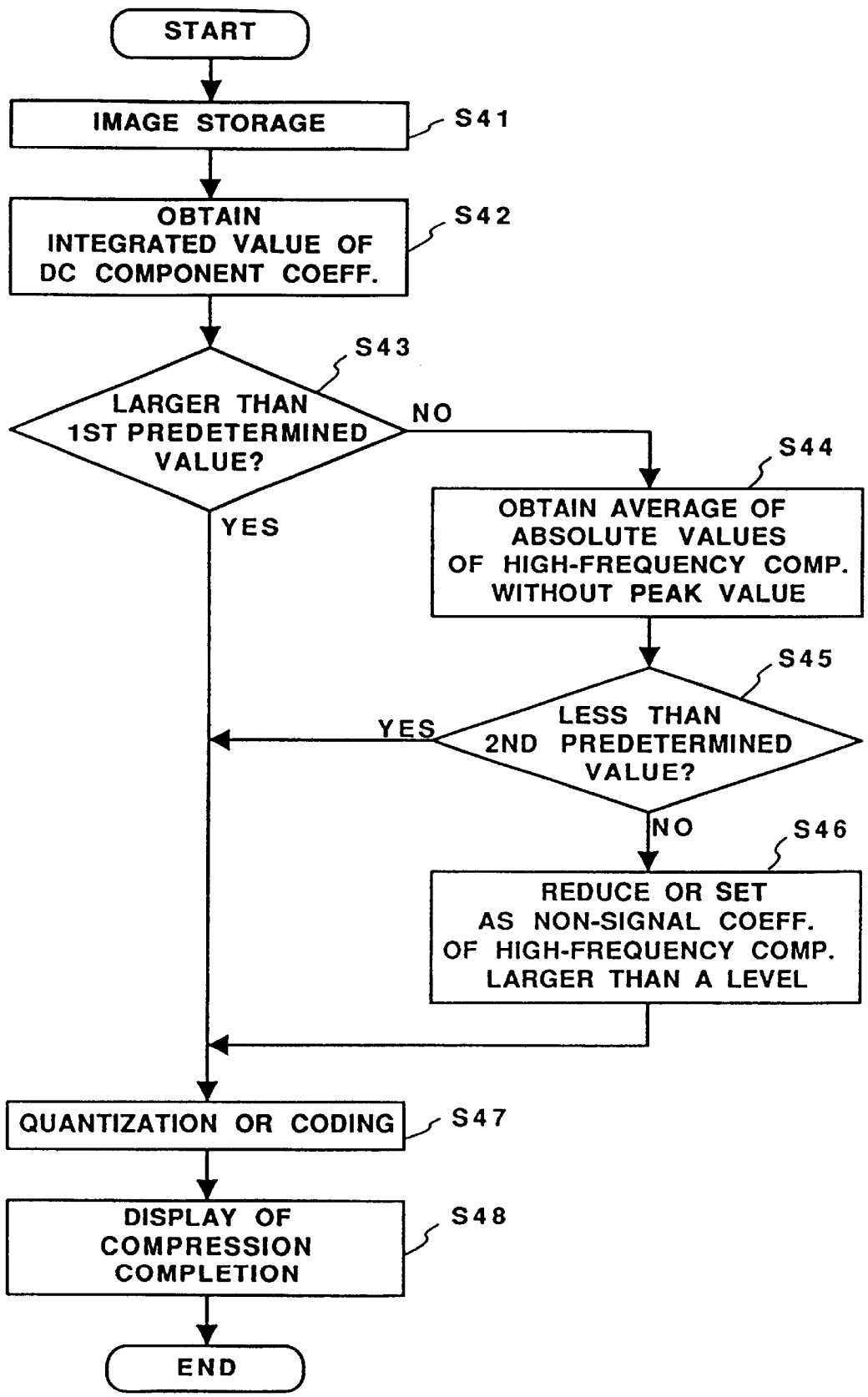
F I G. 13

IMAGE PROCESSING APPARATUS HAVING MEANS FOR CONTROLLING EXPOSURE USING AN ORTHOGONAL TRANSFORMATION COEFFICIENT

BACKGROUND OF THE INVENTION

1. Field of the Invention

The present invention relates to an image processing apparatus and, more particularly, to an image processing apparatus which encodes and outputs an image signal which was inputted from an image pickup section.

2. Description of the Related Art

The typical examples for the above-described image processing apparatus are an electronic camera and a video camera. In an electronic camera, the controls such as the shutter speed, focus, zoom, and diaphragm (lens aperture) controls are performed in the lens unit. A gain control is performed in the image pickup section by processing a signal, which was photoelectrically converted and outputted from a CCD. These controls, i.e., the diaphragm and gain controls, are called the automatic exposure control (which is referred to as AE below). The gain control is performed by a voltage control amplifier (referred to as VCA) and clamping circuit (referred to as CL). A video signal which is outputted from the image pickup section is converted to a digital signal by an A/D converter and stored in memory. Then, the digital signal which was read out from the memory is compressed and encoded respectively by a quantizer and coder, and then outputted as coded output.

However, in conventional image processing, the aforementioned controls and the adjustment for the brightness level are complicated which causes the apparatus to be quite large. In addition, since noise removal is not enough, there is the drawback that an efficiency of coding is decreased. A few other drawbacks in the conventional apparatus are further described below.

In an image processing apparatus, which adjusts a brightness level, the following arrangement is well known. First, a video signal is inputted to the A/D converter and converted to a digital signal. The digital signal is stored in the memory. Then, the brightness level which was inputted through a microprocessor (CPU) is added by an adder to every pixel of the video signal which was being stored in the memory. However, since the brightness level needs to be added to each pixel of image data, there are the drawbacks that the number of adding operation is increased, buffer quantity for data which relates to the addition is increased, and the apparatus becomes both complicated and quite large.

FIG. 19 is a block diagram illustrating the arrangement of a conventional electronic camera. The reference numeral 10 is a lens unit comprising a photograph lens, shutter, and diaphragm. The CCD image pickup device 12 converts a subject image picked-up by the lens unit 10 into an electrical signal. The image pickup processing circuit 14 performs a well-known camera signal processing operation such as a gamma correction on the output of the image pickup device 12 and outputs a standard type video signal. The image pickup processing circuit 14 adjusts the gain so that white and black peak levels will be within a predetermined range. The A/D converter 16 digitizes the output of the image pickup processing circuit 14 and the output is temporarily stored in the memory 18. The image data which was read from the memory 18 is either modulated or coded if necessary, and recorded on a recording medium.

The system controller 28 drives a shutter of the lens unit 10 by the shutter drive circuit 30 and also drives a focusing lens and zooming lens by the lens drive circuit 32. Furthermore, the system controller 28 directly controls a diaphragm. Instructions for photographing and the like are inputted to the system controller 28 in a manner such that a user operates the operation section 34. The display section 36 displays the state of operation.

The system controller 28 calculates the white and black peak levels in a screen (or a predetermined area) from the output of the A/D converter 16 (or the memory 18) and controls the gain of the image pickup processing circuit 14 so that the levels will be at a predetermined level.

On the other hand, in an electronic camera which electromagnetically records a still image and a moving image, e.g. an electronic still camera and video camera, the method such that an image is compressed and stored using a recording medium in digital recording has recently been of interest. In this method, because of the digital recording, image deterioration by duplication is decreased and many images can be recorded in a small recording capacity because of compression recording.

However, in the above-described electronic camera in the case of photographing at a low light intensity or at a high shutter-speed, the S/N ratio of the output signal of the image pickup device 12 deteriorates, and if the image is compressed as it is, the quality of the image decreases. Furthermore, there is another drawback such that the compressing efficiency is decreased, since a high-frequency component of an image having a deteriorated S/N ratio is large.

Furthermore, in the case where an image source to be compressed is a reproduction image of a video tape recorder or an output of a TV tuner, the image does not have a sufficient S/N ratio. If such an image is compressed as is, not only is the quality of the image decreased, but also the efficiency of compression is decreased.

As an example, a block diagram of the gain adjustment arrangement in the conventional image processing apparatus is shown in FIG. 20. An analog video signal is inputted to an input terminal and the voltage control amplifier (VCA) 14a amplifies the analog video signal to reach a predetermined white peak level and the clamping circuit 14b clamps a DC level so that the analog video signal reaches a predetermined black peak level.

The output of the clamping circuit 14b is converted to a digital signal by the A/D converter 16 and stored in the memory 18.

The system controller 28 comprising a microcomputer seeks white and black peak levels from the output of the memory 18 and controls the gain of the VCA 14a and the clamping level of the clamping circuit 14b so that the dynamic range of the A/D converter 16 is fully utilized. For example, if the range of the A/D converter 16 is set from "0" to "FF" (hexadecimal notation), the video signal of white and black peaks shown in FIG. 5A is expanded to the video signal shown in FIG. 5B.

However, in the conventional apparatus, since the white and black peaks are detected from the signal after the A/D conversion, there is a drawback such that the processing of the gain adjustment is susceptible to noise, impulse noise in particular. That is, there is a drawback such that false peak levels are detected and the dynamic range of the A/D converter 16 cannot be efficiently utilized.

This drawback has also arisen when the image data stored in the memory is compressed.

The apparatus which performs AE control is shown in FIG. 21. As shown in the diagram, the image is converted to an electrical signal in the lens unit 10 and the solid state pickup device 12 (which is referred to as CCD below), and then converted to a video signal in the image processing circuit 14. It is further converted to a digital signal in the A/D converter 16 and stored in memory 18. It is then compressed by the image data compressor 20 and the coded output is outputted.

Finally, the AE operation is described. The video signal which was obtained in the CCD 12 and the image processing circuit 14 is converted to a digital signal by the A/D converter 25 through the LPF (low-pass filter) 23 and the SW (switch) 24. Then, the digital signal is integrated by the integrator 26 and inputted into the system controller 28. While the output of the integrator 26 is supervised optimize the inputted light quantity of the CCD 12, the system controller 28 controls an amplifier gain of the iris, or diaphragm, control and image processing circuit 14 and performs automatic exposing.

However, in this conventional apparatus, since the LPF 23, SW 24, A/D converter 25, and integrator 26 are necessary for AE, there are drawbacks that the arrangement of the apparatus becomes complicated resulting in a increased cost.

SUMMARY OF THE INVENTION

Accordingly, it is an object of the present invention to provide an image processing apparatus which improves the quality of an inputted image, a pickup image in particular, by a simple arrangement, and also improves the compressing efficiency in a case of compression.

It is another object of the present invention to provide an image processing apparatus capable of high speed adjustment of a brightness level by a simple arrangement.

It is another object of the present invention to provide an image processing apparatus which can be insusceptible to impulse noise of an input signal.

It is another object of the present invention to provide an image processing apparatus which can be insusceptible to a quality deterioration of the input signal.

It is another object of the present invention to provide an image processing apparatus which avoids the deterioration of the S/N ratio and improves the efficiency of compression by a simple construction.

It is another object of the present invention to provide an image processing apparatus which performs the most suitable automatic exposure control by a simple arrangement.

According to the present invention, the foregoing object is attained by providing an image processing apparatus which comprises an orthogonal transformation means, controls an image pickup signal on the basis of various components (e.g. DC component and high-frequency component) outputted from the orthogonal transformation means, and improves a quality of the image by this simple arrangement.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a block diagram which illustrates the arrangement of the second embodiment;

FIG. 8 is a flowchart which illustrates the operation of the third embodiment;

FIG. 13 is a flowchart which illustrates the operation of the fifth embodiment;

DESCRIPTION OF THE PREFERRED EMBODIMENTS

Preferred embodiments of the present invention will now be described in detail in accordance with the accompanying drawings.

[First Embodiment]

Figure 1:
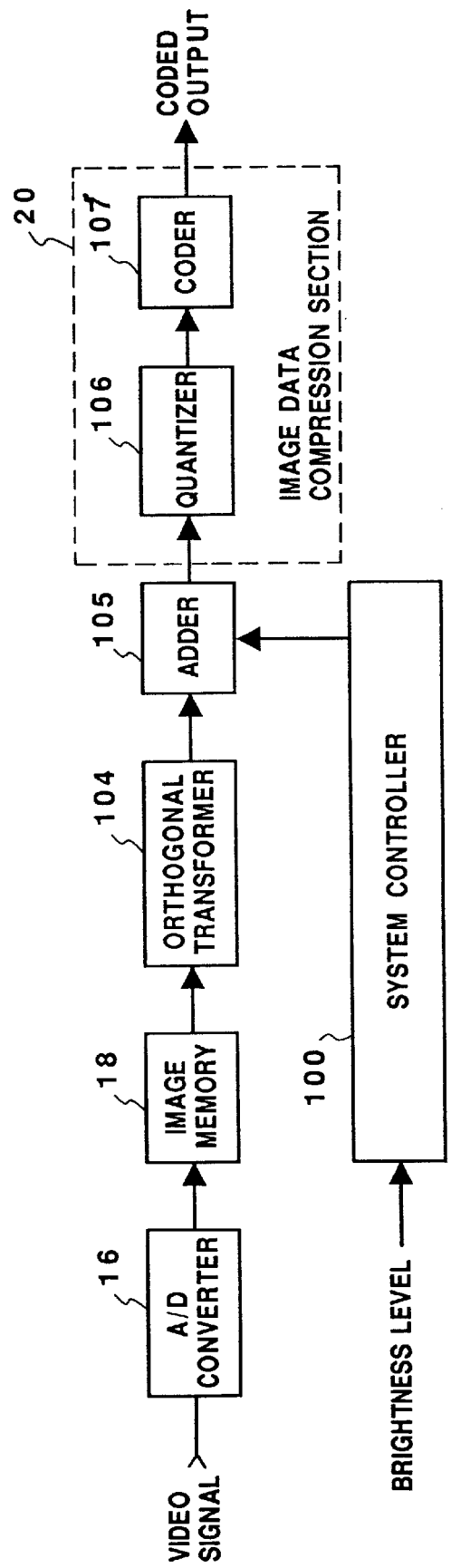
FIG. 1 is a block diagram which illustrates the arrangement of the image processing apparatus of the first embodiment.

FIG. 1 is a block diagram which illustrates the arrangement of the image processing apparatus of the first embodiment. In the diagram, a video signal is inputted into the A/D converter 16. The signal is then converted to the digital signal and stored in the image memory 18. The discrete cosine transform (DCT) operation is performed on the digital signal, which was stored in the image memory 18, in the orthogonal transformer 104. Then, the signal which was stored in the memory 18 is inputted into the adder 105 after the DCT operation has been performed.

The system controller 100 comprising a CPU, ROM, and RAM inputs a brightness level, which is impressed from the outside, to the adder 105. The adder 105 adds the brightness level which was inputted from the system controller 100 to a DC component of a transformation coefficient obtained by the DCT, and then, outputs the DCT coefficient, including the brightness level. The quantizer 106 quantizes the DCT coefficient and the quantized coefficient is coded by the coder 107. Thus, the coded output including the brightness level is obtained. In this arrangement, the image compressing section 20 is comprised of the quantizer 106 and the coder 107.

In general, in the case where the 2-dimensional DCT is performed on image data f(i, j) of the N×N pixels, the transformation coefficient F(u, v) is expressed in the following equation (1):

$$F(u, v) = \frac{4C(u) \cdot C(v)}{N \cdot N} \sum_{i=0}^{N-1} \sum_{j=0}^{N-1} f(i, j) \times \cos\{(2i+1) \cdot u \cdot \pi/2N\} \cdot \cos\{(2j+1) \cdot v \cdot \pi/2N\} \quad (1)$$

The "u" and "v" correspond respectively to spatial frequency of the x- and y-direction in two dimensions and $C(u) \cdot C(v)$ is expressed in the following equations (2):

$$C(u) \cdot C(v) = 1/\sqrt{2} \text{ (when } u \cdot v = 0)$$

$$C(u) \cdot C(v) = 1 \text{ (when } u \cdot v \neq 0) \quad (2)$$

Figure 2:
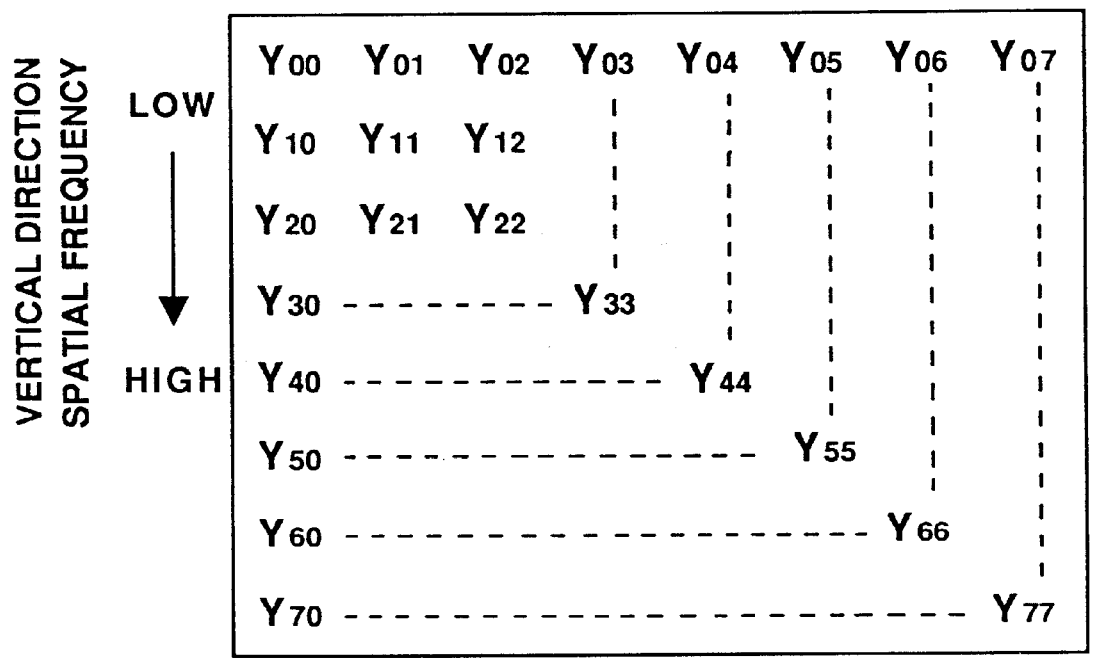
FIG. 2 is a diagram which illustrates the transformation coefficient of 8×8 pixels.

For example, in the case of N=8, the transformation coefficients of 8×8 pixels are as shown in FIG. 2. In the diagram, $Y_{00}$ is a component of the frequency "0" and corresponds to the coefficient of a DC component and an average of 8×8 pixels. The $Y_{00}$–$Y_{07}$ of the first row represent the coefficients of spatial frequency components in the horizontal direction. The spatial frequency becomes higher from the left to the right. Therefore, the coefficient $Y_{07}$, which is located at the first row, in the far right (the eighth) column, corresponds to the coefficient of the highest spatial frequency in the horizontal direction. On the other hand, the $Y_{10}$–$Y_{70}$ of the left (the first) column represent the coefficients of spatial frequency component in the vertical direction. The spatial frequency increases from the top to the bottom. Therefore, the coefficient $Y_{70}$, which is located at the bottom (eighth) row, the first column, corresponds to the coefficient of highest spatial frequency in the vertical direction.

Next, the procedure for the adding operation of a brightness level in the image processing apparatus is described.

Figure 3:
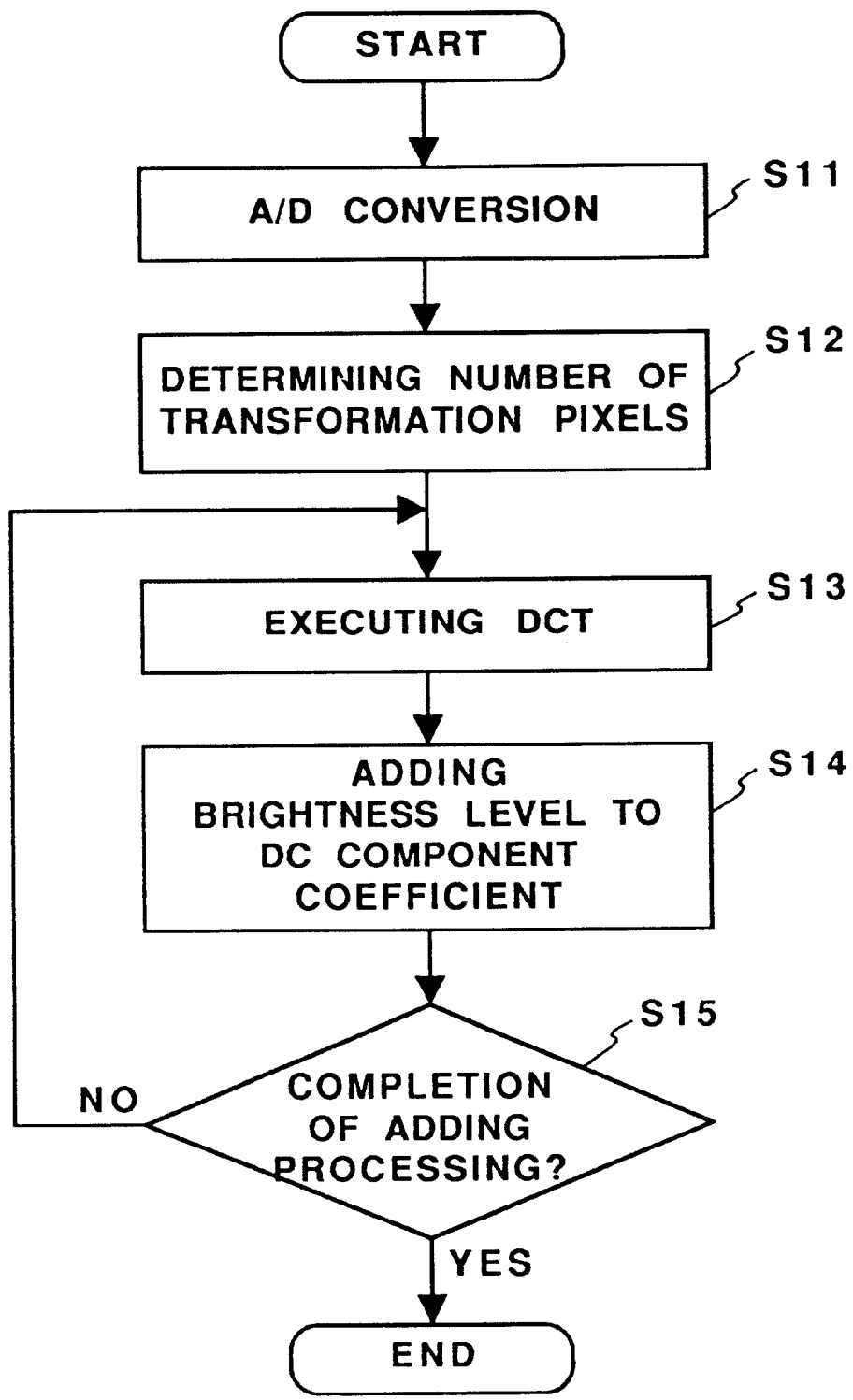
FIG. 3 is a flowchart which illustrates the procedure for the operation of adding a brightness level in the image processing apparatus in the first embodiment.
Figure 5A:
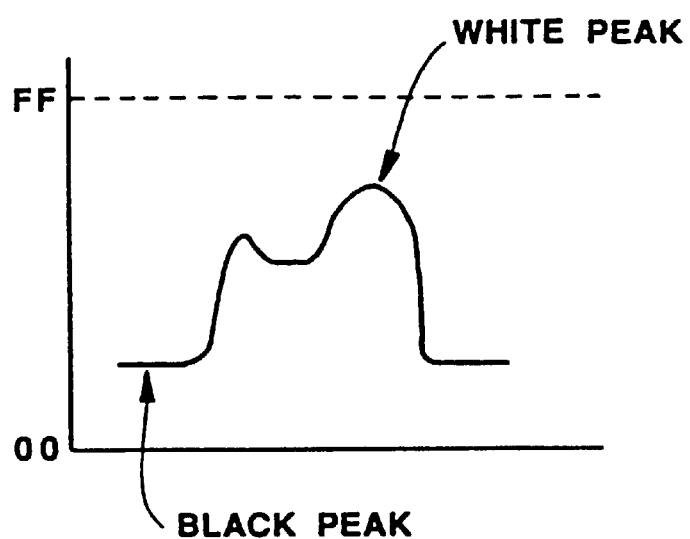
FIGS. 5A and 5B are explanatory diagrams which illustrate the gain control and the DC level control.
Figure 5B:
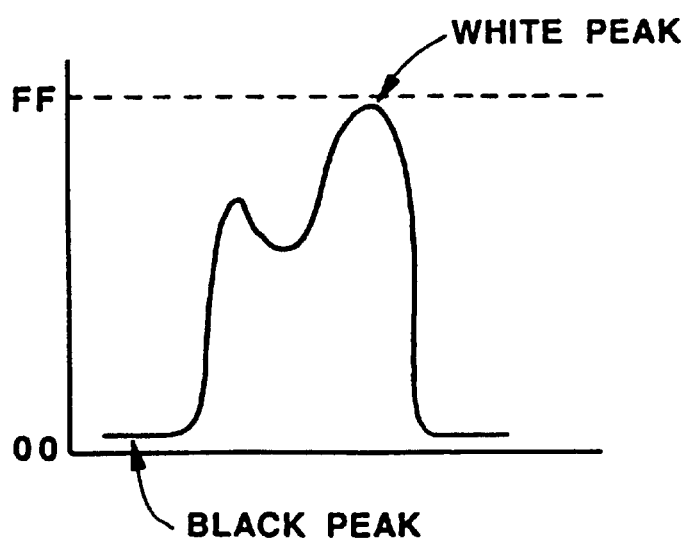

FIG. 3 is a flowchart which illustrates the procedure for the brightness level adding operation in the image processing apparatus of the first embodiment. In step S11, a video signal is converted to a digital signal by the A/D converter. In step S12, the number of pixels to be transformed by the DCT is determined. It is supposed that the number of pixels to be transformed is 8×8 pixels in the present embodiment.

In step S13, according to the number of the transformation pixels, determined in step S12, the DCT is performed on the video signal which was converted to the digital signal. In step S14, the brightness level, inputted in the system controller 100, is added to the DC component of the transformation coefficient, obtained by the DCT in step S13, and the DCT coefficient including the brightness level is outputted. Then, in step S15, it is examined whether or not the addition of the brightness level to a predetermined amount of the video signal has been completed.

If the result of the examination in step S15 is YES, the process of adding the brightness level is completed, while if the result is NO, the process returns to step S13 where the DCT is performed on the video signal to be converted next.

As described above, according to the image compressing apparatus of the present embodiment, since the number of converting pixels is predetermined to be 8×8 pixels, the result obtained by adding the brightness level to the coefficient of the DC component after the DCT brings the same result obtained when the DCT is performed after the brightness level, is added to the average of 8×8 pixels. Therefore, the number of processes in which the brightness level is added is reduced to 1/(8×8) of the conventional processing which adds the brightness level to each pixel.

In the accordance with the present embodiment, by adjusting a brightness level in a manner such that the brightness level is added to the DC component coefficient of the DCT output, the number of adding processes for the brightness level can be reduced in proportion to the number of converted pixels, and consequently, high-speed processing can be performed.

Furthermore, along with the reduction of the number of the processes, a buffer quantity which relates to the adding processing can be also reduced, therefore, the apparatus can be simplified.

Furthermore, in the above embodiment, the DCT is used as an orthogonal transformation, however, other types of orthogonal transformation, e.g. a Hadamard transformation, can be applied to attain the same result. In addition, the number of converting pixels was predetermined as 8×8 pixels in the present embodiment, however, other settings may be used.

Still further, in the above embodiment, the addition of brightness level was performed on the coder side, however, the addition on the modem side also brings the same effects.

[Second Embodiment]

FIG. 4 is a block diagram which illustrates the arrangement of the second embodiment. The reference numeral 130 is an input terminal of an analog video signal to be compressed, the numeral 14a is a VCA, the numeral 14b is a clamping circuit, the numeral 16 is an A/D converter, the numeral 18 is a memory, the numeral 104 is an orthogonal transformer, the numeral 20 is an image compressor, and the numeral 144 is an output terminal for the coded data.

The numeral 100 is a system controller which searches for the white and black peaks from the DC component of the output from the orthogonal transformer 104 and controls the gain of the VCA 14a and clamping level of the clamping circuit 14b. The reference numeral 148 is a zone designation switch which designates an operation range of white and black peak levels by the system controller 100. The zone can be selectively designated as "whole", "center", and "manual".

The operation according to the second embodiment is now described in the case where the two-dimensional DCT is performed by the orthogonal transformer 104. In the present embodiment, the gain control of the VCA 14a and the clamping level control of the clamping circuit 14b are performed as follows.

The two-dimensional DCT in the orthogonal transformer 104 is the same as that of the first embodiment.

In the second embodiment, the system controller 100 searches for the white and black peak levels from a coefficient of the DC component which is outputted from the orthogonal transformer 104. In this way, the white and black levels can be obtained such that the influence of any impulse noise is removed.

Figure 6A:
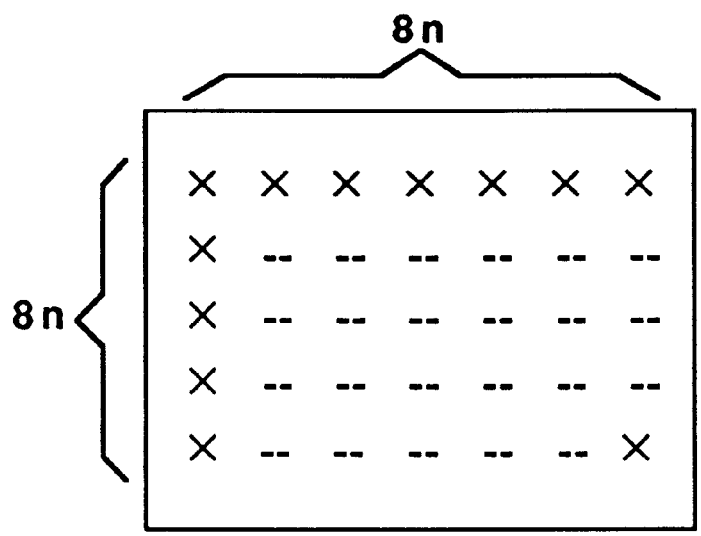
FIGS. 6A–6E are explanatory diagrams which illustrate the designated zone of the zone designation switch 48.
Figure 6B:
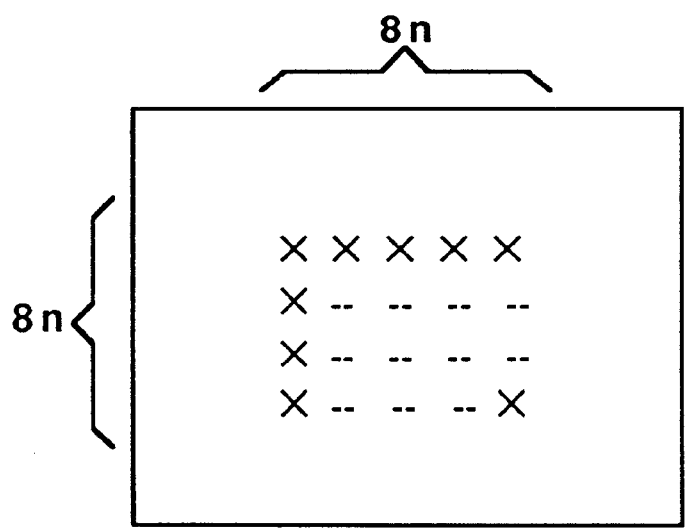
Figure 6C:
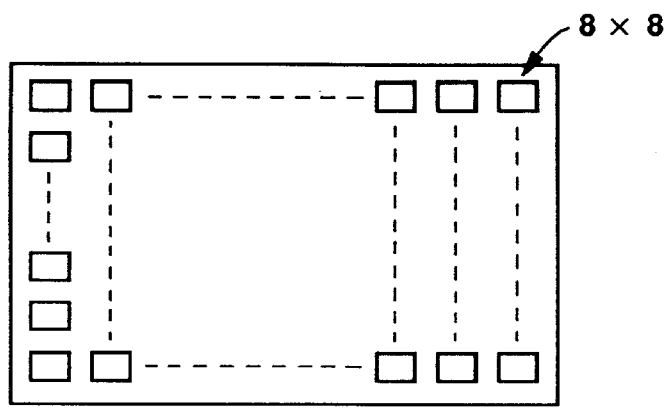
Figure 6D:
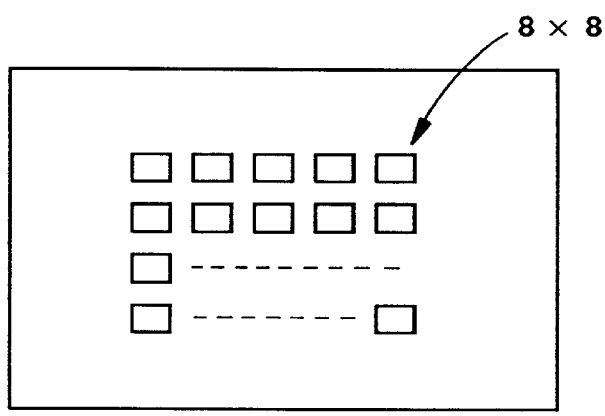
Figure 6E:
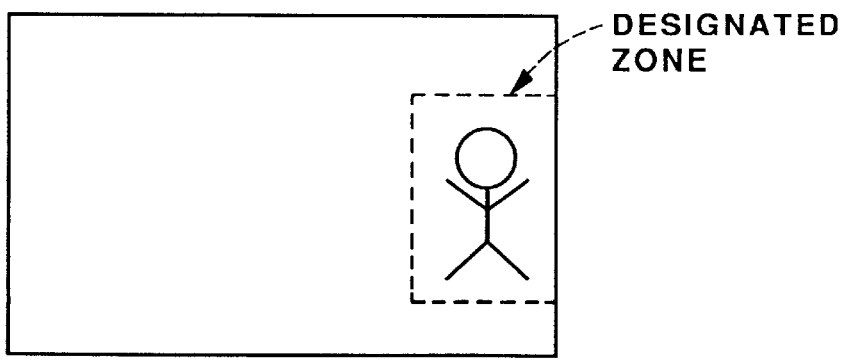

The system controller 100 also obtains the white and black peak levels from the output of the orthogonal transformer 104 on the whole screen (FIG. 6C), the central area of the screen (FIG. 6D), and the area which was designated by manual selection (FIG. 6E).

According to the present embodiment, although an input signal of the input terminal 130 by the VCA 14a is amplified, an attenuation circuit also may be utilized for level adjustment. In addition, in the present embodiment, the gain control and DC level control are performed prior to the A/D conversion, however, the control can be performed after the A/D conversion with the same results. Furthermore, the orthogonal transformation of the orthogonal transformer 104 can be replaced, i.e. by the Hadamard transformation, rather than the DCT. The present invention can be further applied to the method which does not fix an orthogonal transformation unit as N×N pixels and changes the number of pixels according to a noise level.

As easily understood from the above-described second embodiment of the present invention, the gain and DC level can be controlled without being susceptible to the impulse noise. Therefore, a dynamic range of the A/D converter can be effectively utilized regardless of the quantity of noise.

[Third Embodiment]

Figure 7:
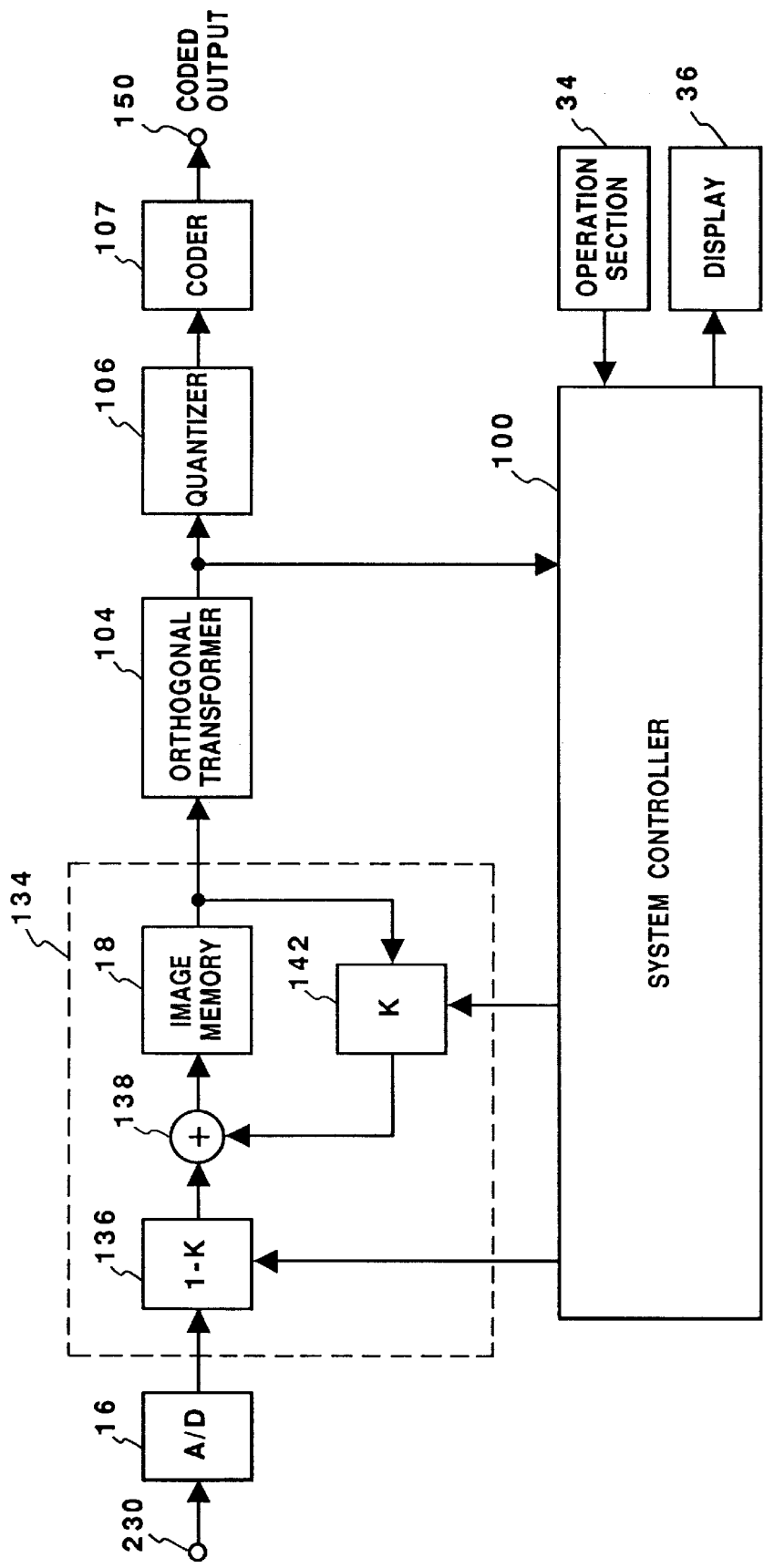
FIG. 7 is a block diagram which illustrates the arrangement of the third embodiment.

FIG. 7 is a block diagram which illustrates the components of the third embodiment. The reference numeral 230 is an input terminal for the image signal to be processed and the numeral 16 is an A/D converter which digitizes the image signal from the input terminal 230. The numeral 134 is a recursive type noise reducing circuit comprising the coefficient circuit of the coefficient (1−K) 136, the adding circuit 138, the image memory 18 as a delay circuit for a screen, and the coefficient circuit of the coefficient (K) 142. The reference numeral 104 is an orthogonal transformer of the DCT which is similar to the one in the first embodiment and the numeral 106 is a quantizer which quantizes the output coefficient of the orthogonal transformer 104. The reference numeral 107 is a coder which encodes the output of the quantizer 106 and the numeral 150 is an output terminal for the code obtained by the coder 107.

The numeral 100 is a system controller comprising a CPU, ROM, and RAM which controls the coefficients (1−K) and (K) of the coefficient circuits 136 and 142 in the noise reducing circuit 134 according to the output of the orthogonal transformer 104 (the coefficient of the DC component in particular). The numeral 34 is an operation section where a user inputs an instruction to the system controller 100 and the numeral 36 is a display which displays a state of operation and the like.

The flowchart illustrating the operation according to the third embodiment is shown in FIG. 8. Referring to FIG. 8, the operation is now described.

When an image signal which was inputted from the outside into the input terminal 230 is to be stored in the image memory 18, a variable n representing how many times image data has been stored into the image memory 18 is set to "1" by the system controller 100 and the corresponding coefficients (1−K) and (K) are determined. For example:

$K = 1 - 1/n$ $1 - K = 1/n$

The output of the A/D converter 16 is multiplied by (1−K) by the coefficient circuit 136 and impressed to the adding circuit 138. The coefficient circuit 142 multiplies the output of the image memory 18 by K and impresses it to the adding circuit 138. The adding circuit 138 adds the outputs of the coefficient circuits 136 and 142 and supplies them to the image memory 18. Since at the first time (n=1), k=0, the output of the A/D converter 16 is written in the image memory 18 as it is (S22).

The orthogonal transformer 104 transforms the image by means of the DCT, which is stored in the image memory 18, and the transformation coefficient shown in FIG. 2 is output. The system controller 100 picks up and reads the coefficients of the high frequency components of the outputs of the orthogonal transformer 104 in the pattern as shown in FIG. 6 and removes the values of the peaks. Then the average of the absolute values is obtained (S23). The coefficients of the high frequency component are, for example, $Y_{60}$-$Y_{66}$-$Y_{06}$, $Y_{70}$-$Y_{77}$-$Y_{07}$ in FIG. 2. FIG. 6C shows the whole screen, FIG. 6D shows the central area of the screen, and FIG. 6E shows the area which is designated by manual selection in which the user selectively designates one area. In a way of accommodating the selecting means, noise in a predetermined area is detected and S/N ratio can be improved according to the result of detection.

In the case where the average of the absolute values of the coefficients of the high frequency component is over the predetermined value (S24), the system controller 100 increases the variation n and obtains the corresponding coefficients (1−K) and (K) (S25). Then, noise reduction is performed on the output of the A/D converter 16 which is taken into the image memory 18.

In the case where the average of the absolute values of the coefficients of the high frequency component is less then the predetermined value (S24), the system controller 100 displays the completion of storage to the image memory 18 and completes the noise reduction. After that, the orthogonal transformation coefficient of the image which is stored in the image memory 18 is quantized and coded.

In short, according to the present embodiment, the amount of the high frequency component is examined by the orthogonal transformation coefficient. In the case where the high frequency component is over a predetermined amount, it is diagnosed that a considerable amount of noise is included and the amount of noise is reduced in a manner such that a larger area of the image is averaged. In the recursive type noise reduction, if the number of adding operation is n, the S/N ratio is improved by as much as $n^{1/2}$ times as that of the conventional S/N ratio.

Figure 9:
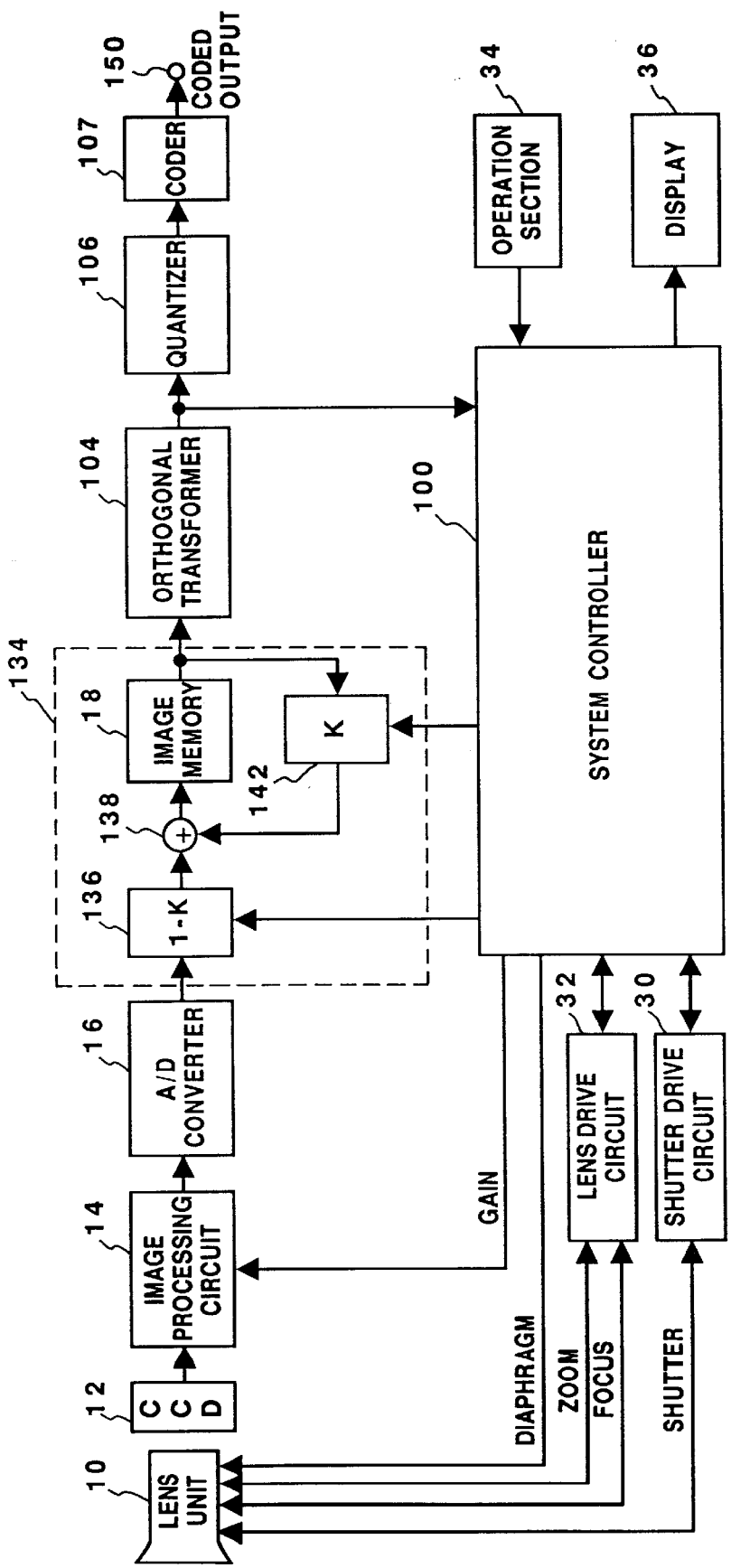
FIG. 9 is a block diagram of the arrangement in an electronic camera.

The block diagram of the arrangement in the case of applying the present invention to a video camera, or an electronic still camera is shown in FIG. 9. Some of the reference numerals designate the same or similar parts in both in FIGS. 7 and 9. The reference numeral 10 is a lens unit internally comprising a photographic lens, a shutter, and a diaphragm. The numeral 12 is a CCD image pickup device which converts the picture to an electrical signal by the lens unit 10. The numeral 14 is an image pickup processing circuit which performs signal processing, e.g. a gamma correction, on the output of the image pickup device 12, and outputs the standard type video signal. The image pickup processing circuit 14 further adjusts the gain so that the white and black peak levels will be within the predetermined range. The numeral 30 is a shutter drive circuit which drives a shutter of the lens unit 10 and the numeral 32 is a lens drive circuit which drives a focusing lens and zooming lens in the lens unit 10. In addition to the above described functions, the system controller 100 controls functions including the aperture of the lens unit and shutter, focusing lens, and zooming lens, through the shutter drive circuit 30 and the lens drive circuit 32.

In the present embodiment, the orthogonal transformer 104 performs the DCT, however, it can be replaced by the Hadamard transformation. Furthermore, the unit of the orthogonal transformer may be other than fixed as N×N pixels and the method which changes the unit according to a noise level can be utilized.

As easily understood from the above described third embodiment, according to the present invention, a highly efficient compression can be realized as well as an improvement of the S/N ratio.

In other words, a quantity of noise can be estimated from the amount of high frequency component of the image to be compressed which can be obtained from the orthogonal transformation coefficient. In the case where a considerable amount of noise is included, the noise reduction level is increased by the noise reduction means. On the other hand, in the case where an amount of noise is little, the noise reducing level is decreased. In this way, an image in which the S/N ratio is over a predetermined value can still be obtained. The image data is transformed by the orthogonal transformation, and quantized, and then coded. Thus, a high efficiency of compression is realized.

[Fourth Embodiment]

Figure 10:
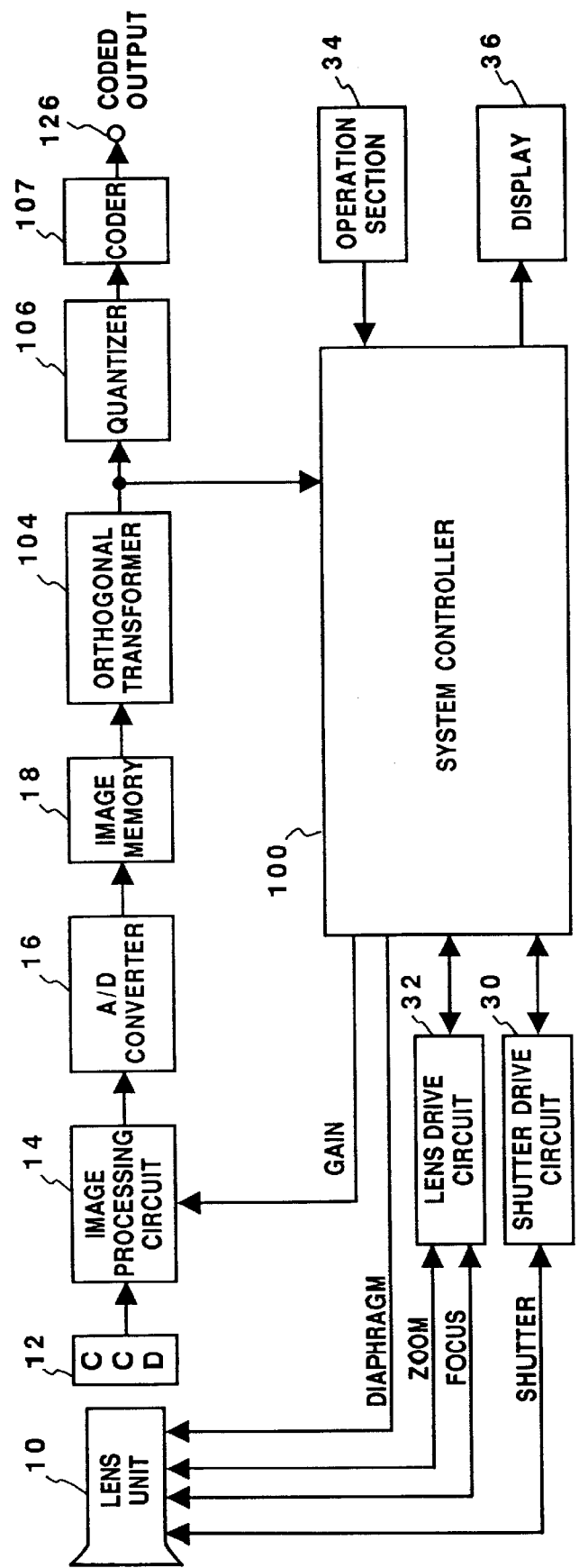
FIG. 10 is a block diagram of the arrangement of the fourth embodiment.

FIG. 10 is a block diagram of the arrangement of the fourth embodiment. Some of the reference numerals designate the same or similar parts both in FIGS. 9 and 10. In the present embodiment, the following are provided: the orthogonal transformer 104 which performs an orthogonal transformation on the output of the image memory 18, quantizer 106 which quantizes the orthogonal transformation coefficient by the orthogonal transformer 104, and coder 107 which codes the output of the quantizer 106. When the image data for a screen is stored in the image memory 18, the image data of the image memory 18 is transformed by the orthogonal transformation (e.g. DCT) and the quantizer 106 quantizes the coefficient output by the orthogonal transformer 104. The output of the quantizer 106 is coded by the coder 107 and outputted to the outside through the output terminal 126. The output is either modulated or demodulated, if necessary, and recorded on a recording medium by recording unit 108.

The feature of the present embodiment is that the quantity of noise of the image is calculated from the orthogonal transformation coefficient, particularly from the coefficient of the high frequency component, which is outputted from the orthogonal transformer 104, and a quantity of exposure of the image pickup device (CCD) 12 such as lens aperture and/or shutter open period is controlled. The system controller 100 further comprises the functions of controlling lens aperture and/or shutter.

The two-dimensional DCT in the orthogonal transformer is similar to that of the first embodiment.

Figure 11:
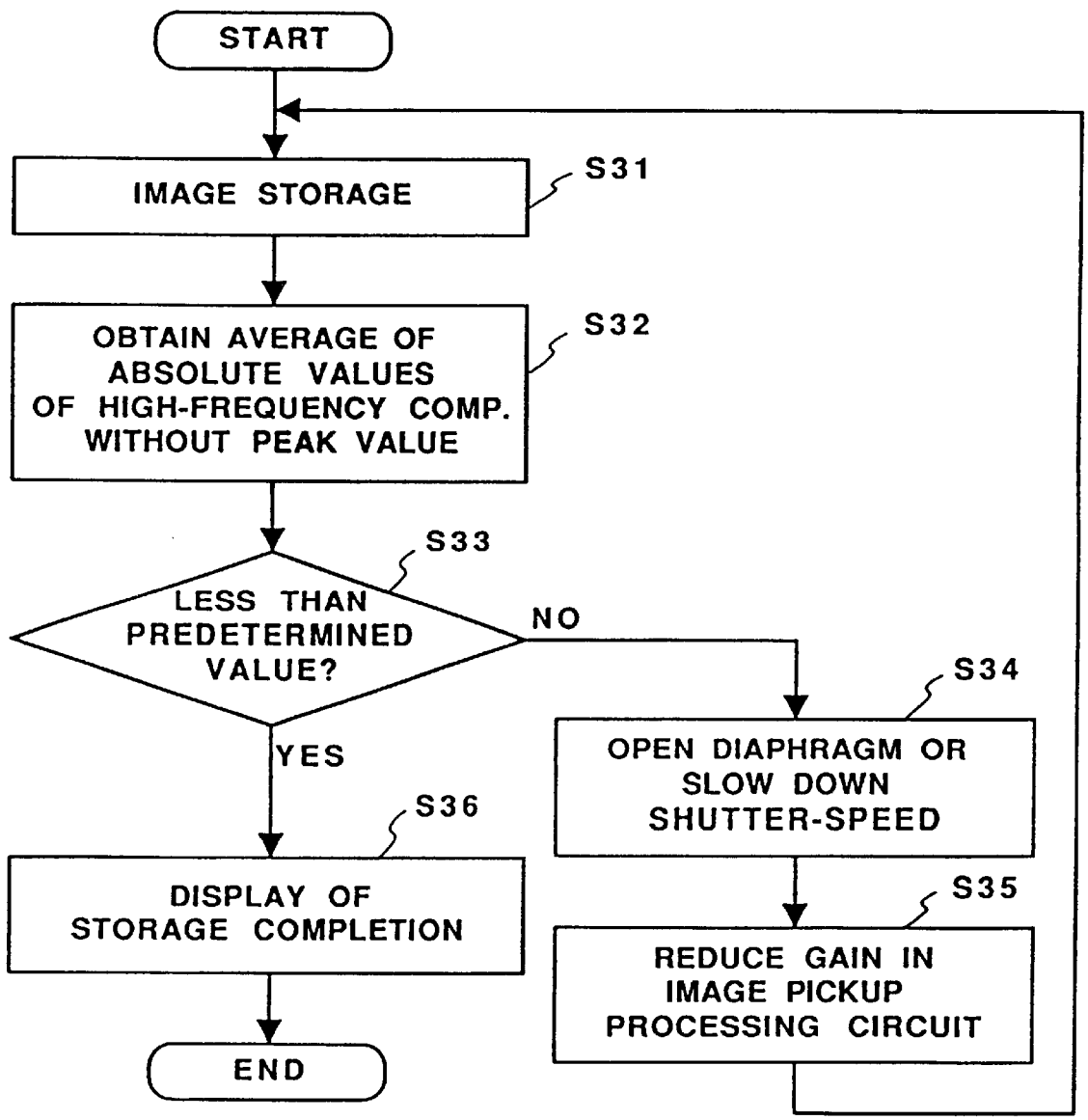
FIG. 11 is a flowchart which illustrates the operation of the fourth embodiment.

Referring to the flowchart in FIG. 11, the operation of the characteristic part of the fourth embodiment is described. When started, after the output signal of the image pickup device 12 is processed by the image pickup processing circuit 14, it is digitized by the A/D converter 16, and then written in the image memory 18 (S31). The orthogonal transformation 104 performs the DCT on the image which will be stored in the image memory 18 and outputs the transformation coefficient shown in FIG. 2. The system controller 100 reads the coefficients of the frequency components of the output of the orthogonal transformer 104 by the pattern as shown in FIGS. 6A–6E, and removes the peak values, and then, obtains the average of the absolute values (S32). The coefficients of the high frequency components are, for example, $Y_{70}$-$Y_{77}$-$Y_{07}$ in FIG. 2. FIG. 6C shows the whole screen, FIG. 6D shows the central area of the screen, and FIG. 6E shows the area which was designated by manual selection, and the user selectively designates one of these areas. By this selection, the user can get the optimum amount of exposure on a desired area.

In the case where the average of the absolute values of the coefficients of the high frequency components is over the predetermined value (S33), the system controller 100 either opens the lens aperture or slows down a shutter speed (S34). Then, the gain of the image pickup system is reduced for the amount that the sensitivity of the image pickup section was increased (S35). Then, the image pickup signal is again stored into the image memory 18 (S31).

In the case where the average is less than the predetermined value (S33), the system controller 100 displays the completion of storage to the image memory 18 on the display 36 (S36). After that, the orthogonal transformation coefficient of the image which was stored in the image memory 18 is quantized and coded.

In short, according to the present embodiment, the amount of the high frequency component is examined by referring to the orthogonal transformation coefficient. In the case where the high frequency component is over a predetermined amount, it is diagnosed that a considerable quantity of noise is present. In the case where the noise is over the predetermined amount, the quantity of the exposure of the image pickup device 12 is increased. In the way, the noise caused by lack of exposure is considerably reduced.

In the present embodiment, the orthogonal transformation of the orthogonal transformer 104 is a discrete cosine transform (DCT), however, it can be replaced by the Hadamard transformation.

As easily understood from the described fourth embodiment, according to the present invention, since the pickup image in which the noise is lower than the predetermined amount is attained, a highly efficient compression is realized. Furthermore, the S/N ratio of the reproduced image will be over the above predetermined value and a fine quality reproduced image is obtained.

In other words, a quantity of noise which is included in the pickup image is estimated from the orthogonal transformation coefficient. In the case where the estimated noise quantity is a considerable amount, the quantity of exposure of the image pickup means is increased. That is, the lens aperture of optical system is opened and/or a shutter open period is extended. In this way, the noise of the pickup image is reduced and the compression efficiency is kept at over the predetermined rate in the coding means.

[Fifth Embodiment]

Figure 12:
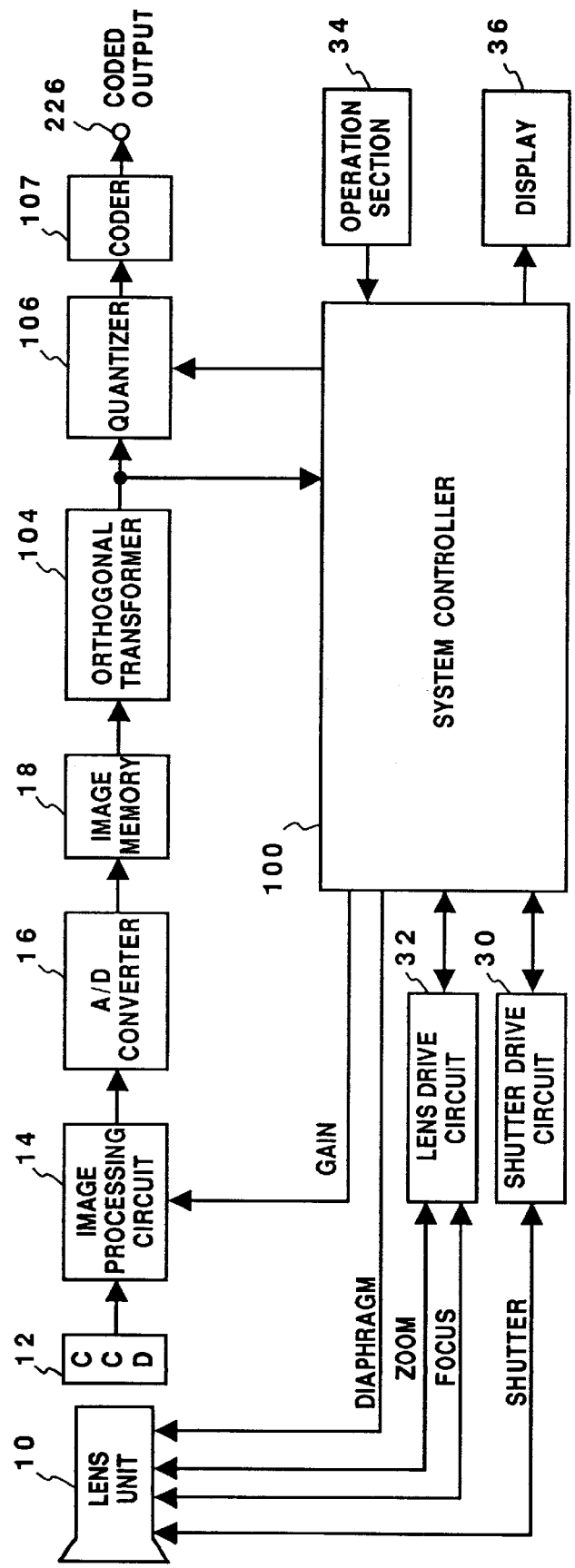
FIG. 12 is a block diagram of the arrangement of the fifth embodiment.

FIG. 12 is a block diagram of the arrangement of the fifth embodiment. Some of the reference numerals designate the same or similar parts both in FIGS. 10 and 12. In the present embodiment, the following are provided: the orthogonal transformer 104 which performs an orthogonal transformation on the output of the image memory 18, the quantizer 106 which quantizes the orthogonal transformation coefficient by the orthogonal transformer 104, and the coder 107 which codes the output of the quantizer 106. When the image data for a screen is stored in the image data memory 18, the orthogonal transformer 104 performs an orthogonal transformation (e.g. DCT) and the quantizer 106 quantizes the coefficient which was outputted by the orthogonal transformer 104. Then, the coder 107 encodes the output of the quantizer 106 and outputs the coded data through the output terminal 226. The output which was outputted to the outside is either modulated or demodulated, if necessary, and recorded on a recording medium by recoding unit 108.

The quantizer 106 is a circuit which controls a quantizing characteristic from the outside. The system controller 100 controls the quantizing characteristic according to the output of the orthogonal transformer 104.

The two-dimensional DCT of the orthogonal transformer 104 is similar to that of the first embodiment.

Referring to the flowchart in FIG. 13, the operation of the characteristic part of the fifth embodiment is described. When started, after the output signal of the image pickup device 12 is processed by the image pickup processing circuit 14, it is digitized by the A/D converter 16, and then written in the image memory 18 (S41). The orthogonal transformer 104 transforms the image which is stored in the image memory 18 by the DCT transformation. The system controller 100 reads the coefficient ($Y_{00}$ in FIG. 2) of the DC component in a screen by the pattern shown in FIGS. 6A–6E, which is outputted by the orthogonal transformer 104, and obtains the integrated value of the DC component in the screen (S42). FIG. 6C is an area of the whole screen, FIG. 6D is an area of the central part of the screen, and FIG. 6E is an area which was designated by manual selection. A user can selectively designate one of these areas by the operation section 34. By providing a selection means, noise in a desired area can be detected.

In the case where the integrated value of a DC component is less than a first predetermined value, for example 50% luminance level that represents 50% of the dynamic range of luminance (S43), the system controller 100 takes the coefficients of the high frequency components which are outputted from the orthogonal transformer 104 in a similar way to the pattern of the DC component and the average of the absolute values without the peak values is obtained (S44). The coefficients, of the high frequency component are, for example, $Y_{60}$-$Y_{66}$-$Y_{06}$ are $Y_{70}$-$Y_{77}$-$Y_{07}$. In the case where the integrated value is over a second predetermined value, for example 60% luminance level (S45), the characteristics of quantization are set so that the peak values are removed and the coefficients of the high frequency components which are over the predetermined value are reduced, or set as a non-signal (S46). The quantizer 106 quantizes the output of the orthogonal transformer 104, and the coder 107 encodes the output of the quantizer 106 (S47).

After quantization and coding, the completion of an image compression is displayed on the display 36 (S48).

In short, according to the present embodiment, in the case where the image level is relatively low and the high frequency energy of the image is a considerable amount, the level of the high frequency component is reduced or quantization is performed by regarding the signal as a non-signal. As a result, the S/N ratio and efficiency of compression are both improved.

In the present embodiment, the orthogonal transformer 104 performs the DCT, however, it can be replaced by the Hadamard transformation. The present invention can also be applied to a line input by a CCD line sensor other than the compression of the image pickup by the image pickup device. The unit of the orthogonal transformation may be other than fixed as N×N and a method which changes the unit according to noise level can be utilized. Furthermore, for quantization, it can be set so that a matrix can be selected according to DC and AC components of the orthogonal transformation.

As easily understood from the above described embodiment, both an S/N ratio and efficiency of compression can be improved in a manner such that quantization is performed according to the characteristic of the state of the image to be compressed.

In other words, according to the present invention, the amounts of the DC component and high frequency component of the image to be compressed can be estimated from the output of the orthogonal transformation means. For example, in the case where the DC component is less than the predetermined value and the high frequency component is over the predetermined value, the characteristic of the quantization means is changed and controlled so that the coefficient of the high frequency component is reduced or set to "0". In this way, a high efficiency of compression is achieved and the S/N ratio is also improved.

[Sixth Embodiment]

Figure 14:
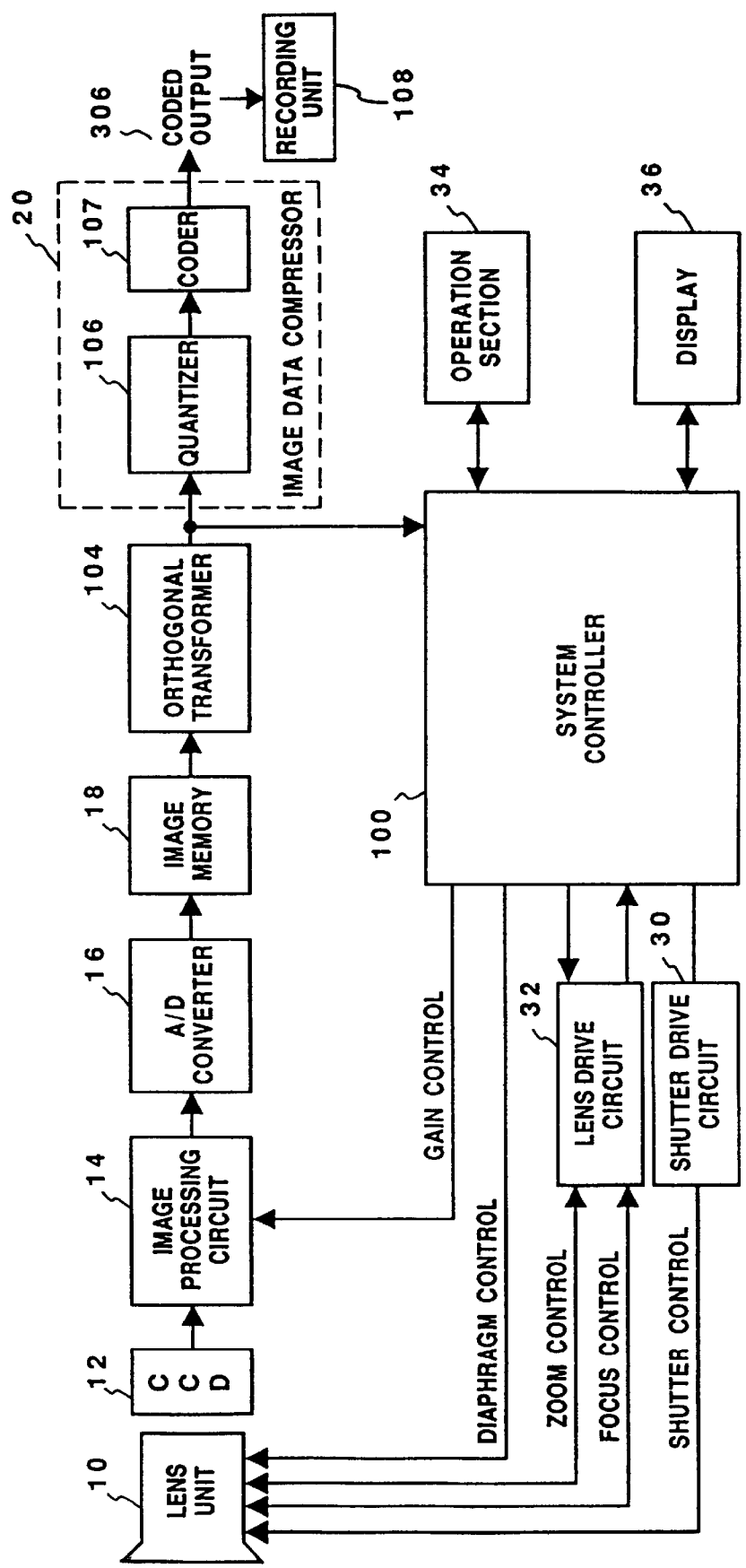
FIG. 14 is a block diagram of the sixth embodiment.

FIG. 14 is a block diagram of the image pickup apparatus according to the sixth embodiment. As shown in the diagram, an image is converted to the electric signal by the lens unit 10 and the CCD 12, and further converted to the video signal by the image pickup processing circuit 14. Then, the video signal is converted to the digital signal by the A/D converter 16, and the image data is compressed by the image data compression section 20, and then the coded output 306 is outputted. This is an orthogonal transformation, compression method which utilizes a two-dimensional DCT, one type of the orthogonal transformation. The output of the A/D converter 16 is stored in the image memory 18 for a screen and the DCT is performed in the DCT section, orthogonal transformer 104, by using the 8×8 pixel data from the image memory 18.

The orthogonal transformation is a two-dimensional DCT which is similar to that of the first embodiment.

Each element of the 8×8 coefficient matrix F(u, v) respectively corresponds to the transformation coefficients of the frequency components which are u/2N times and v/2N times the highest frequency component. As shown in FIG. 2, $Y_{00}$ corresponds to the component of high frequency "0", that is, the coefficient of DC component which is the average of the 8×8 pixels. The first row corresponds to the coefficients of the spatial frequency to the horizontal direction of the image. The $Y_{07}$ in the far right column corresponds to the highest coefficient of the spatial frequency component in the horizontal direction. The left column (the first column) corresponds to the coefficients of the spatial frequency to the vertical direction. $Y_{70}$ which is located at the first column, the bottom (eighth) row corresponds to the highest coefficient of the spatial frequency component in the vertical direction. The output of the orthangonal transformer 104 is transferred to the SQ linear coder, quantizer 106. The coefficient $Y_{00}$ of the DC component is transformed to the one-dimensional predicted code. The coefficients of the DC components except $Y_{00}$ are zigzag-scanned, and further transformed into the variable-length codes by the VLC fixed Huffman coder 107 and the coded output 306 is obtained.

Figure 15:
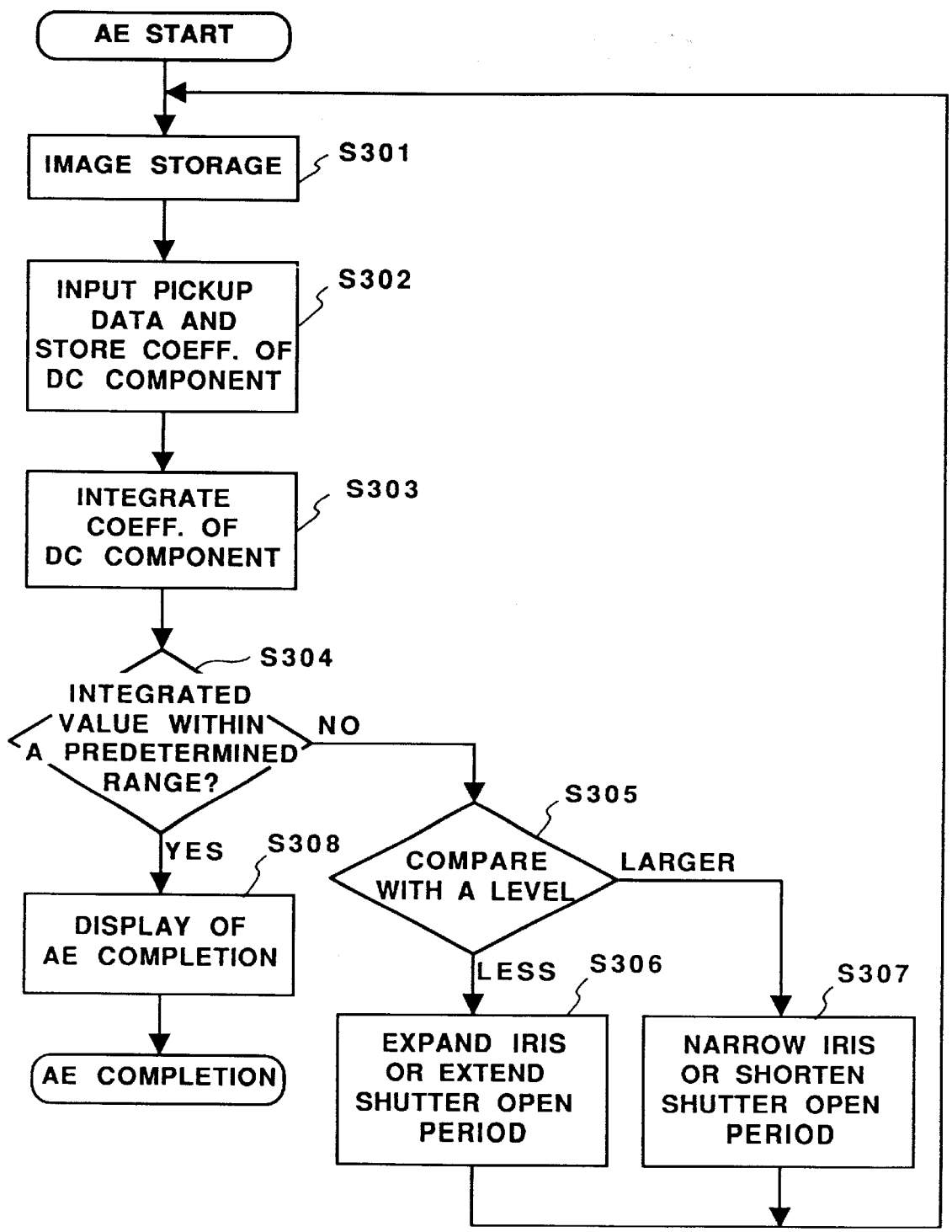
FIG. 15 is a flowchart which illustrates the AE of the sixth embodiment.

The present embodiment is described along with the AE flowchart in FIG. 15. When an AE is started, an image is taken into the image memory 18 through the image pickup processing circiut 14 and the A/D converter 16 (S301). Then, the image data is inputted to the orthogonal transformer 104 from the image memory 18 in the pattern as shown in FIGS. 6A–6E and the coefficient $Y_{00}$ of the DC component of the output of the orthogonal transformer 107 is taken into the system controller 100 (S302). The system controller 100 integrates the coefficient $Y_{00}$ of the DC component (S303) and examines whether or not the integrated value is within the predetermined range (S304). In the case where the value is within the predetermined range (S304, YES), the completion of AE is displayed on the display 36 by the system controller 100 when the AE is completed (S308).

In the case where the integrated value is out of the predetermined range (S304, NO), which did not reach the predetermined level (S305, less), either the iris is expanded n steps or the shutter open period is extended by nt$\mu$s (S306). On the other hand, in the case where the value is larger than the predetermined level (S305, larger), the iris is narrowed n steps or the shutter open period is shortened by nt$\mu$s (S306). Then, the process proceeds to step S301 and the loop is repeated until the integrated value is within the predetermined level range.

As described above, the coefficient $Y_{00}$ of the orthogonal transformer 104 corresponds to the average of the 8×8 pixels. The AE can be controlled so that the light quantity of the input of the CCD 12 becomes optimum by controlling the iris and the shutter open period so that the integrated value becomes optimum by integrating the average in the system controller 100. This operation can be performed on the image in which the outputs of the CCD 12 are appropriately picked up.

FIGS. 6A–6E illustrate the "pick-up pattern" from the screen. FIG. 6A is pick-up from the whole screen, FIG. 6B is pick-up mainly from the central area, FIG. 6C is pick-up of every 8×8 pixels from the whole screen, and FIG. 6D is pick-up of every 8×8 pixels mainly from the central area of the screen. Thus, the weight of photometry is controlled by the density of sample points.

Furthermore, according to present embodiment, although a band compression is performed by the DCT, another orthogonal transformation method such as Hadamard transformation can obtain a similar result.

Figure 16:
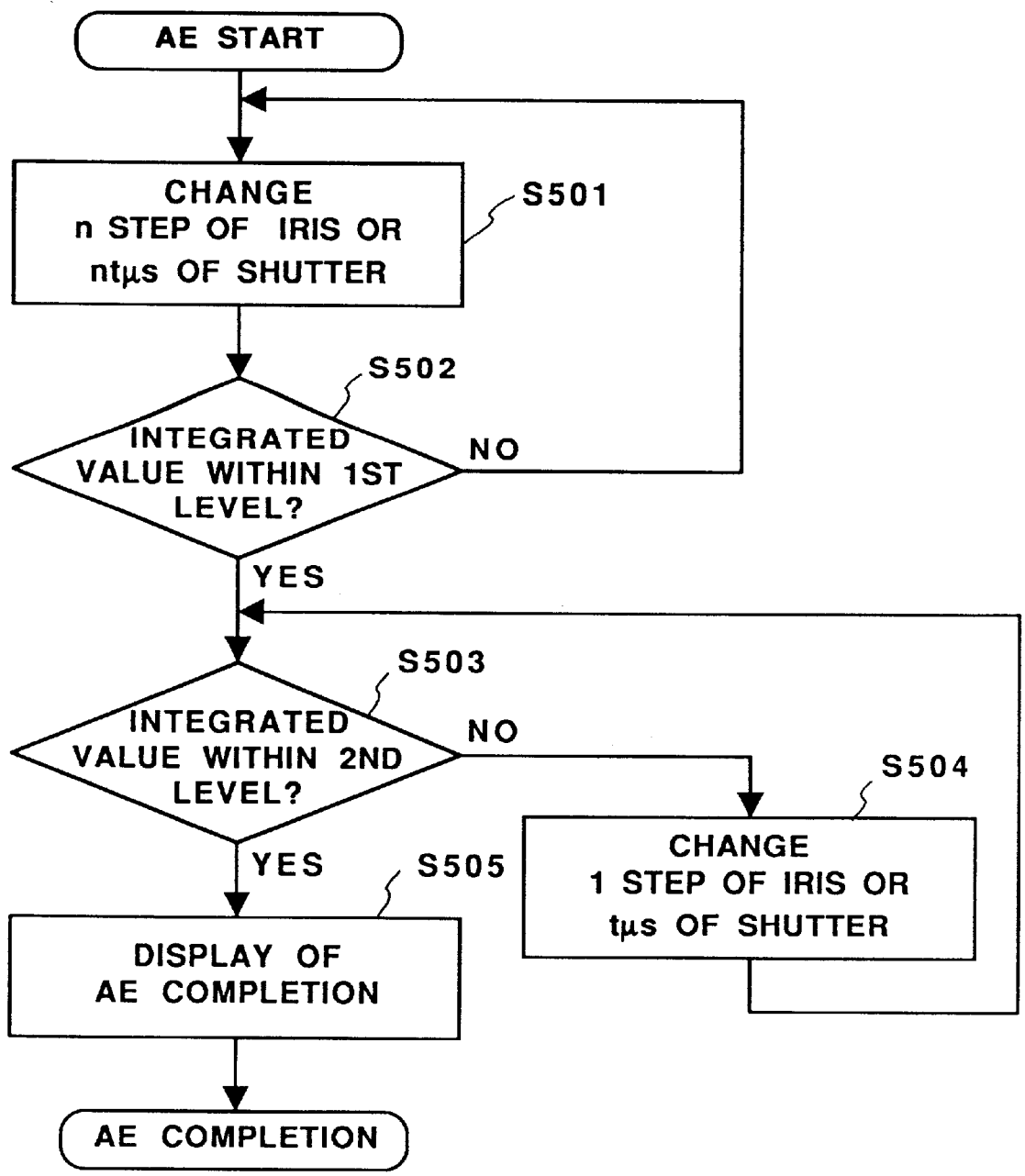
FIG. 16 is another flowchart which illustrates the AE of the sixth embodiment.

Then, another example of the AE operation is described in connection with the flowchart shown in FIG. 16. The whole arrangement is similar to that of FIG. 14.

The object of the present embodiment is to shorten the time required to complete the AE. First, the AE, the n steps iris correction or nt$\mu$s shutter open period correction (N≧2) (S501), is performed. Then, whether or not the integrated value of $Y_{00}$ is within the first level is examined in the system controller 100 (e.g. 60±20% to the whole 100%). In the case where the value is out of the range (S502, NO), steps S501 and S502 are repeated until the value reaches the first level. When the value reaches the first level (S502, YES), whether or not the value is within the second level (e.g. 65±10%). In the case where the value is within the second level (S503, YES), the completion of the AE is displayed on the display 36 (S505) when the AE is completed. In the case where the value is out of the range (S503, NO), the AE control performs a 1 step iris change or t$\mu$s shutter open period correction until the value reaches the second level (S504).

The AE such as n step iris change or nt$\mu$s shutter open period correction means that the AE is controlled in a manner such that the iris drive is changed every n steps or the shutter open period is changed every nt$\mu$s as shown in FIG. 15.

Furthermore, the AE such as 1 step iris change or t$\mu$s shutter open period correction means that the iris drive is changed step by step or a shutter open period is corrected every t$\mu$s.

As described above, in the present embodiment, in the case where the shift of the AE level is quite large, the iris or shutter open period is changed a considerable amount. In the case where the shift is small, the iris or shutter open period is changed only a little. Thus, the time for completion of the AE is shortened and the AE can be performed accurately.

[Seventh Embodiment]

Figure 17:
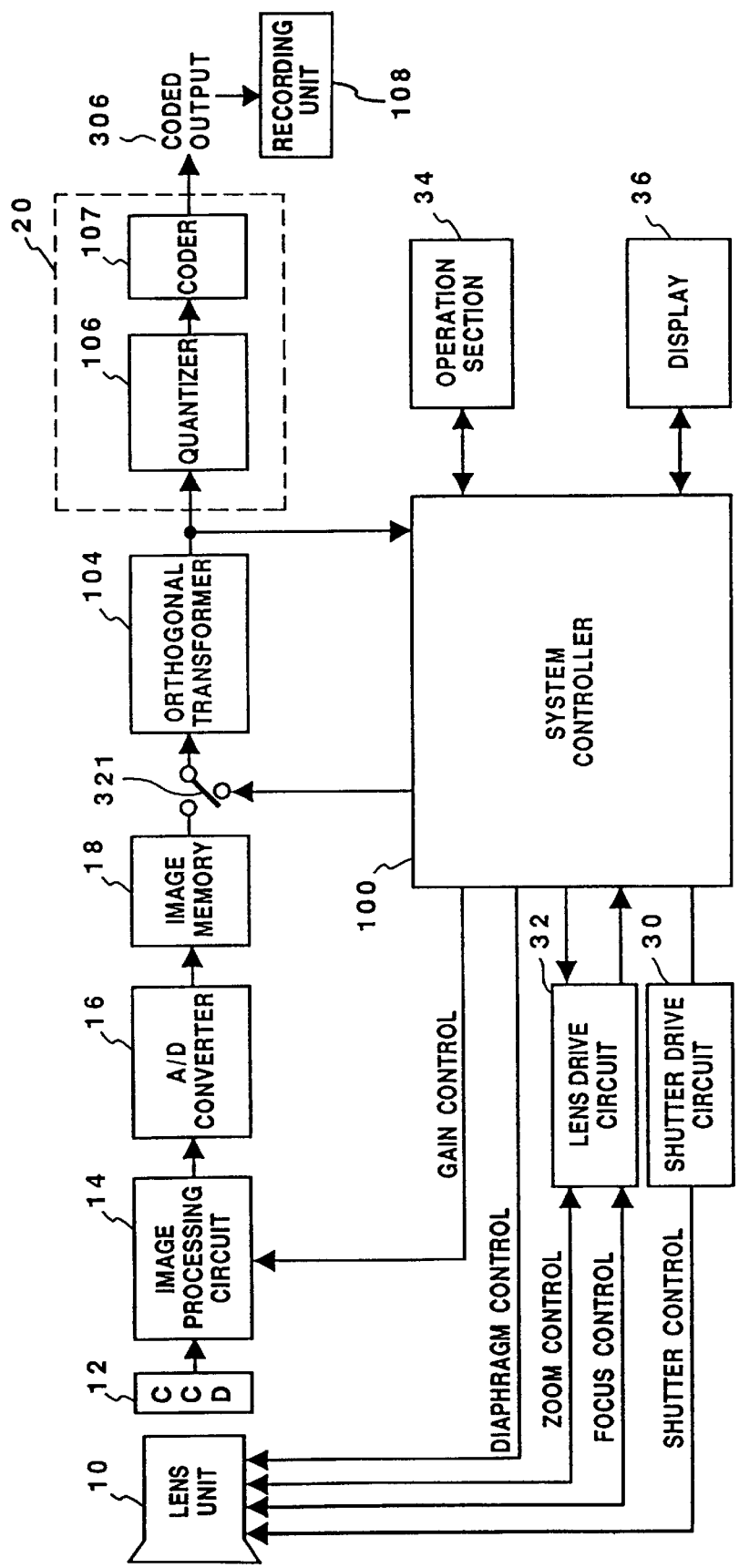
FIG. 17 is a block diagram of the seventh embodiment.
Figure 18:
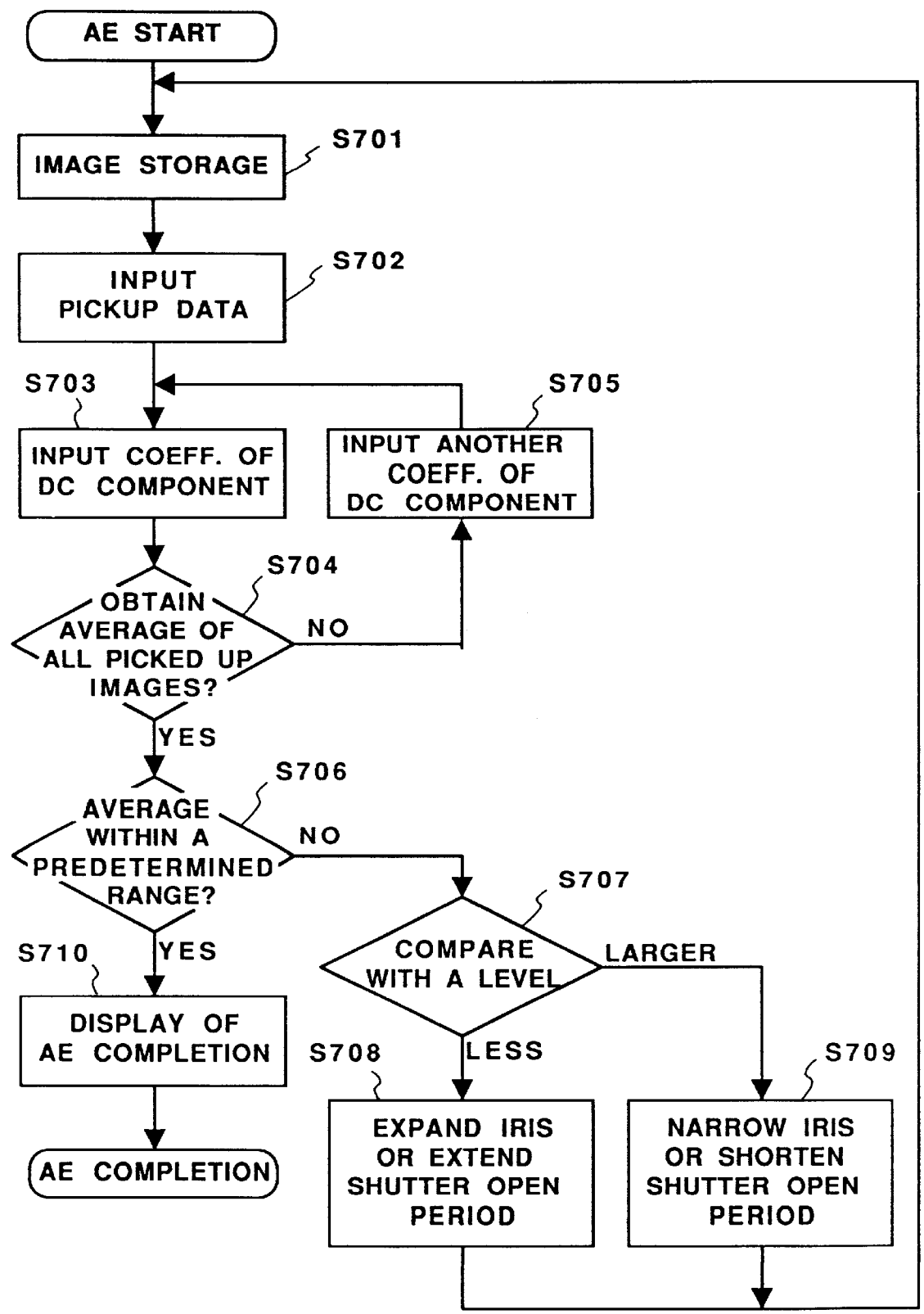
FIG. 18 is a flowchart of the AE of the seventh embodiment.
Figure 19:
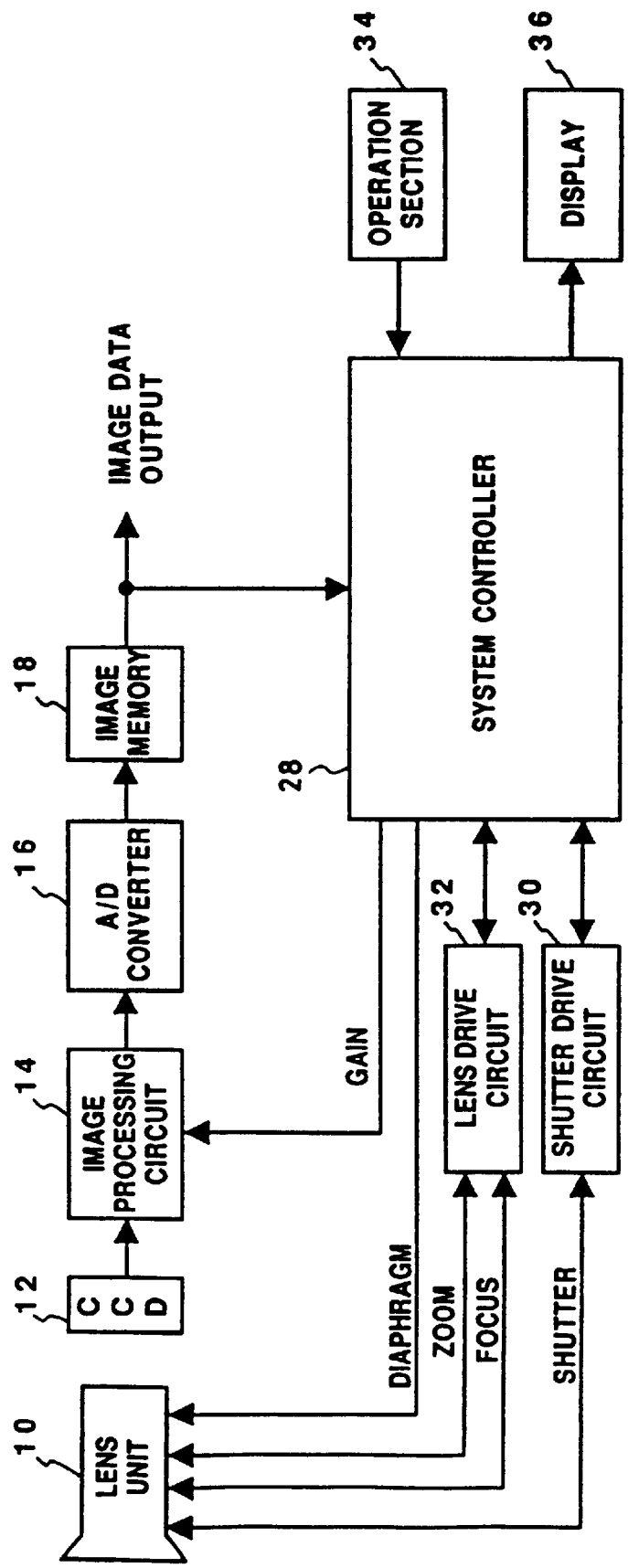
FIG. 19 is a block diagram which illustrates the arrangement of the conventional electronic camera.
Figure 20:
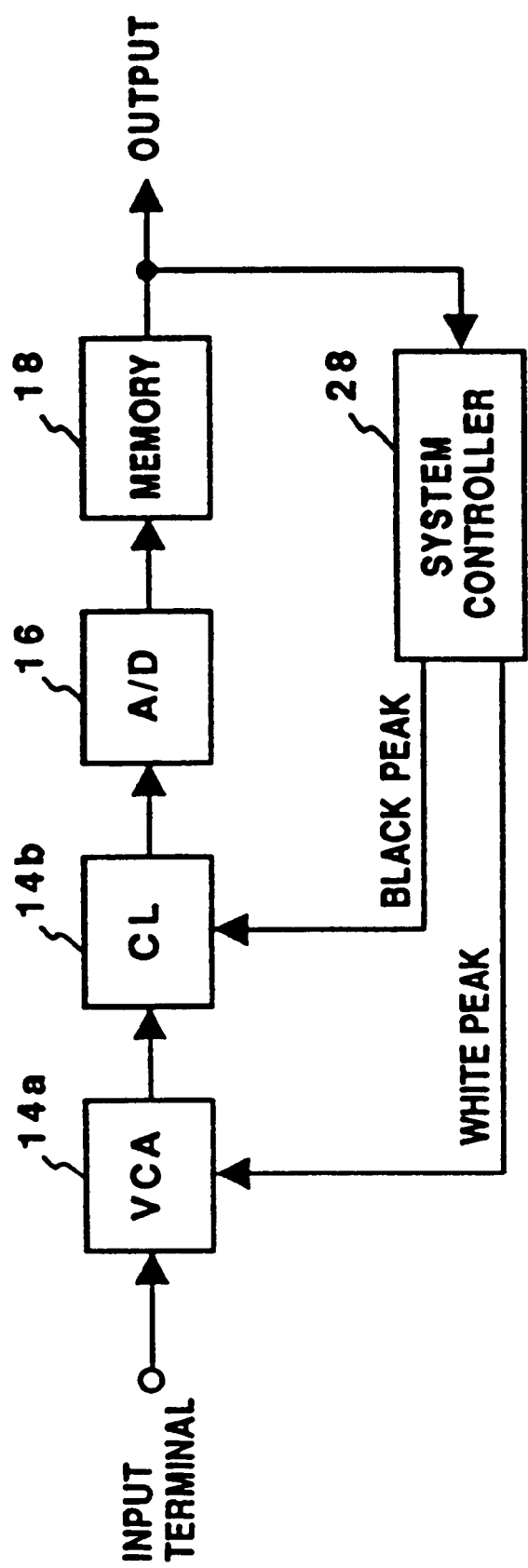
FIG. 20 is a block diagram which illustrates an example of the arrangement of the conventional gain adjustment.
Figure 21:
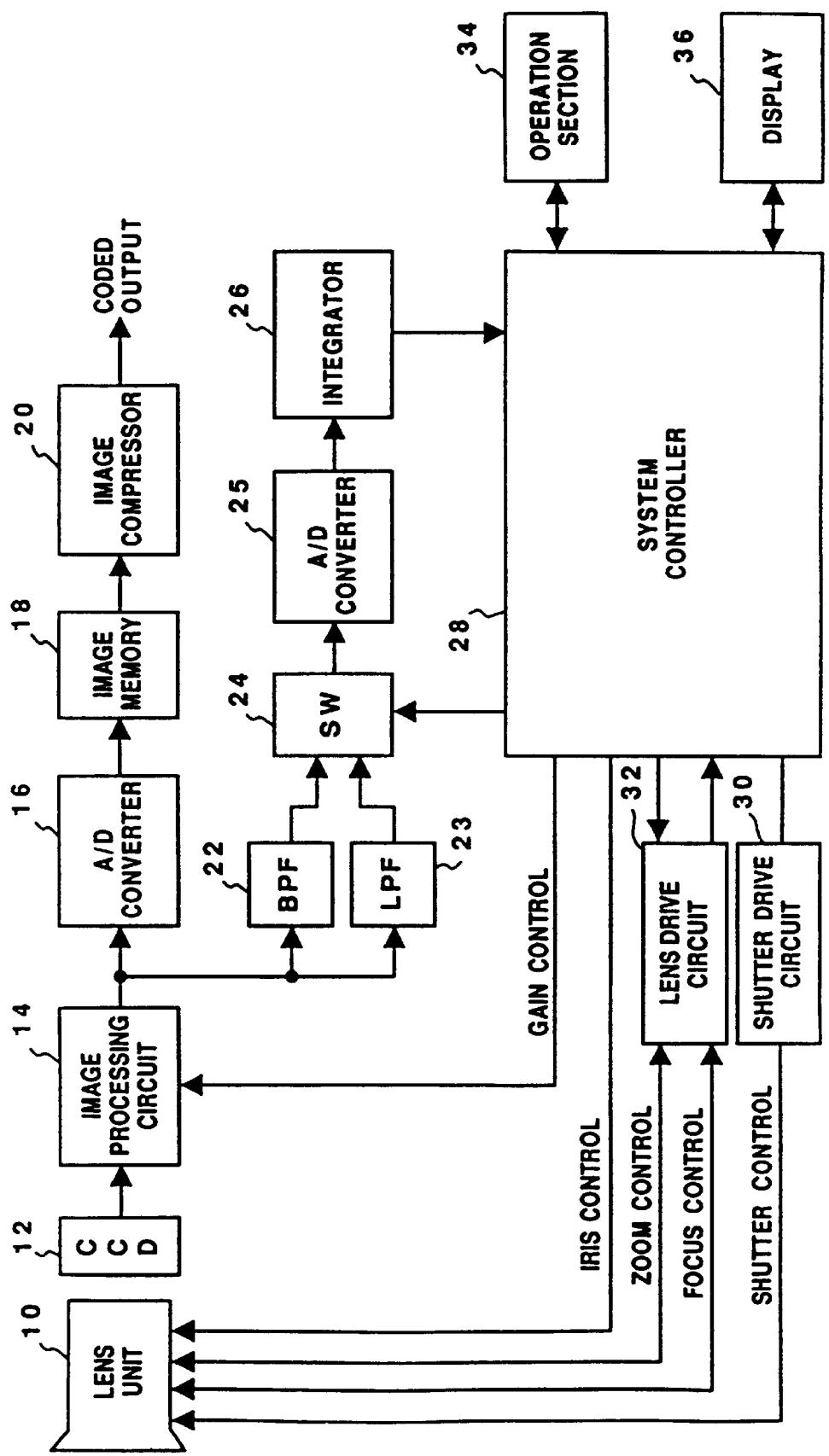
FIG. 21 is a block diagram illustrating the arrangement which performs the conventional AE control.

FIG. 17 illustrates the arrangement of the seventh embodiment. As shown in the diagram, the difference between the sixth and seventh embodiment is that the data of the system controller 100 can be inputted to the orthogonal transformer 104. The present embodiment is described with the accompanying AE flowchart in FIG. 18. First, an image is taken into the image memory 18 from the CCD 12 through the image pickup processing circuit 14 and A/D converter 16 (S701). Then, the image data is inputted to the orthogonal transformer 104 from the image memory 18 by the "pick-up pattern" as shown in FIGS. 6A–6E (S702) and the coefficient $Y_{00}$ of the DC component of the output from the orthogonal transformer 104 is taken into the system controller 100 (S703). Then, whether or not the average of the picked up screen was obtained is examined. In the case where the average has not obtained yet (S704, NO), the coefficient $Y_{00}$ of the DC component which was taken into the system controller 100 is inputted as 8×8 data (64 data) into the orthogonal transformer 104 through the switch 321, and then the process proceeds to step S703.

When the average of the whole picked up screen is obtained (S704, YES), whether or not the average is within the predetermined range is examined. In the case where the average is within the range (S706, YES), the completion of AE is displayed on the display 36 by the system controller 100 (S710) when the AE is completed.

In the case where the average is out of the range (S707, less), which did not reach the predetermined level, either the iris is expanded n steps or the shutter open period is extended nt$\mu$s (S708). On the other hand, in the case where the average is over the predetermined level (S707, over), the iris is narrowed n steps or shutter open period is shortened nt$\mu$s (S709). Then, the process proceeds to step S701 and this operation is repeated until the average reaches the predetermined level range.

As described above, in the accordance with the present invention, the average of all pixels of the picked-up image is obtained by the orthogonal transformer 104 in a manner such that $Y_{00}$, the output of the orthogonal transformer 104, is once returned to the orthogonal transformer 104 through the system controller 100 by using the coefficient $Y_{00}$ of the DC component of the orthogonal transformer 104 and becomes the average of the inputted 8×8 data. The AE is performed by controlling the iris and the shutter open period so that the average will be within the predetermined range.

Furthermore, as described above, according to the present invention which was shown in the sixth and seventh embodiments, the AE is performed in a manner such that the DC component of the image which is obtained during the image data compression processing is utilized, therefore, the LPF, A/D converter, and the integrator for obtaining the low-pass components for the AE are not necessary, and consequently the AE can be performed at a low price.

Furthermore, the present invention which was shown in the first through seventh embodiments can be applied to a system comprising either a single apparatus or a plurality of apparatuses. Needless to say that the present invention can be applied to the case where programs are supplied to the system or apparatus.

Because many apparently widely different embodiments of the present invention can be made without departing from the spirit and scope thereof, it is to be understood that the invention is not limited to the specific embodiments thereof except as defined in the claims.

What is claimed is:

1. An image processing apparatus comprising:
    an image pickup unit arranged to photograph an image and convert the image into an image signal in units of pixels;
    a transformation unit arranged to segment the image signal to form blocks each including a plurality of pixels, perform an orthogonal transformation on the image signal in the units of blocks, and obtain transformation coefficients;
    an encoding unit arranged to encode the transformation coefficients obtained by said transformation unit in units of the blocks and output encoded image data;
    an extracting unit arranged to extract, as specific blocks, a part of the blocks formed by said transformation unit; and a controlling unit arranged to control an exposure of said image pickup unit based upon DC components of the transformation coefficients of the specific blocks extracted by said extracting unit, wherein said controlling unit integrates DC components from the specific blocks and controls the exposure in a first control width when an integrated result of the DC components is not within a range of a first level, controls the exposure in a second control width narrower than the first control width when an integrated result of the DC components is within the range of the first level but not within a range of a second level narrower than the range of the first level, and completes control of the exposure when an integrated result of the DC components is within the range of the second level.

2. An apparatus according to claim 1, wherein said image pickup unit comprises a shutter that controls an amount of light from the image, and wherein said controlling unit controls a speed of said shutter.

3. Apparatus according to claim 1, wherein said image pickup unit comprises an iris that controls an amount of light from the image, and wherein said controlling unit controls said iris.

4. An apparatus according to claim 1, further comprising a recording unit that records, onto a recording medium, the image signal encoded by said encoding unit.

5. An apparatus according to claim 1, further comprising a signal unit that signals completion of control by said controlling unit.

6. An apparatus according to claim 1, wherein said controlling unit controls the exposure by a feed-back control.

7. An apparatus according to claim 6, wherein said controlling unit controls the exposure of said image pick up unit by changing a number of steps for one control based upon the integrated result.

8. An apparatus according to claim 6, wherein said controlling unit further comprises a designating unit arranged to designate the specific blocks.

9. An apparatus according to claim 8, wherein said designating unit designates the specific blocks manually.

10. An image processing method comprising the steps of:

photographing an image and converting the image into an image signal in units of pixels using image pickup means;

segmenting the image signal to form blocks each including a plurality of pixels;

performing an orthogonal transformation on the image signal in units of each block and obtaining transformation coefficients;

encoding the transformation coefficients obtained in said transformation step in units of the block and outputting encoded image data;

extracting, as specific blocks, a part of the blocks formed in said transformation step; and controlling an exposure of the image pickup means based upon DC components of the transformation coefficients of the specific blocks extracted in said extracting step, wherein said controlling step integrates DC components obtained from the specific blocks and controls the exposure in a first control width when an integrated result of the DC components is not within a range of a first level, controls the exposure in a second control width narrower than the first control width when an integrated result of the DC components is within the range of the first level but not within a range of a second level narrower than the range of the first level, and completes control of the exposure when an integrated result of the DC components is within the range of the second level.

\* \* \* \* \*

UNITED STATES PATENT AND TRADEMARK OFFICE
CERTIFICATE OF CORRECTION

| | |
|---|---|
| PATENT NO. | : 6,512,791 B1 |
| APPLICATION NO. | : 07/881866 |
| DATED | : January 28, 2003 |
| INVENTOR(S) | : Makoto Takayama |

It is certified that error appears in the above-identified patent and that said Letters Patent is hereby corrected as shown below:

TITLE PAGE, ITEM [56] REFERENCES CITED:

FOREIGN PATENT DOCUMENTS
Insert: --EP   479510   4/1992   006F15/64--; and
"FR 2575886   4/1985.....H04N/5/217" should be deleted.

COLUMN 1:

Line 53, "picked-up" should read --picked up--.

COLUMN 2:

Line 15, "using" should read --in--; and
Line 16, "in" should read --using--.

COLUMN 6:

Line 15, "can be also" should read --also can be--.

COLUMN 7:

Line 58, "K" should read --(K)--.

COLUMN 8:

Line 20, "then" should read --than--.

COLUMN 12:

Line 34, "orthangonal" should read --orthogonal--; and
Line 44, "circiut" should read --circuit--.

COLUMN 13:

Line 15, "to" should read --to the--.

UNITED STATES PATENT AND TRADEMARK OFFICE
CERTIFICATE OF CORRECTION

PATENT NO. : 6,512,791 B1
APPLICATION NO. : 07/881866
DATED : January 28, 2003
INVENTOR(S) : Makoto Takayama It is certified that error appears in the above-identified patent and that said Letters Patent is hereby corrected as shown below:

<u>COLUMN 14</u>:

Line 3, "not" should read --not been--.

<u>COLUMN 15</u>:

Line 20, "Apparatus" should read --An apparatus--; and
Line 34, "pick up" should read --pickup--.

Signed and Sealed this

Thirty-first Day of March, 2009

JOHN DOLL
*Acting Director of the United States Patent and Trademark Office*